US010701722B2

(12) United States Patent
Kim et al.

(10) Patent No.: US 10,701,722 B2
(45) Date of Patent: Jun. 30, 2020

(54) METHOD AND APPARATUS FOR CONTROLLING CONTENTION WINDOW SIZE IN RADIO ACCESS SYSTEM SUPPORTING UNLICENSED BAND

(71) Applicant: LG ELECTRONICS INC, Seoul (KR)

(72) Inventors: Seonwook Kim, Seoul (KR); Joonkui Ahn, Seoul (KR); Hanjun Park, Seoul (KR); Byounghoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 108 days.

(21) Appl. No.: 15/753,809

(22) PCT Filed: Aug. 19, 2016

(86) PCT No.: PCT/KR2016/009185
§ 371 (c)(1),
(2) Date: Feb. 20, 2018

(87) PCT Pub. No.: WO2017/030417
PCT Pub. Date: Feb. 23, 2017

(65) Prior Publication Data
US 2018/0288790 A1    Oct. 4, 2018

Related U.S. Application Data

(60) Provisional application No. 62/281,150, filed on Jan. 20, 2016, provisional application No. 62/207,904, filed on Aug. 20, 2015.

(51) Int. Cl.
*H04W 72/12* (2009.01)
*H04W 74/00* (2009.01)
(Continued)

(52) U.S. Cl.
CPC ....... *H04W 72/1278* (2013.01); *H04L 1/0038* (2013.01); *H04L 1/1822* (2013.01);
(Continued)

(58) Field of Classification Search
CPC .......... H04W 72/1278; H04W 74/006; H04W 74/0816; H04W 74/0808; H04W 16/14;
(Continued)

(56) References Cited

U.S. PATENT DOCUMENTS

2017/0339588 A1* 11/2017 Moon .................. H04W 88/02
2018/0175975 A1*  6/2018 Um ...................... H04L 1/1816

FOREIGN PATENT DOCUMENTS

| WO | 2015/064922 A1 | 5/2015 | |
|---|---|---|---|
| WO | 2015/080488 A1 | 6/2015 | |
| WO | WO-2017030310 A1 * | 2/2017 | ........... H04L 1/1816 |

OTHER PUBLICATIONS

3GPP TR 36.889 V1.0.1 "Study on Licensed-Assisted Access to Unlicensed Spectrum (Release 13)", Jun. 8, 2015, pp. 43, 53.
(Continued)

*Primary Examiner* — Justin T Van Roie
(74) *Attorney, Agent, or Firm* — Dentons US LLP

(57) ABSTRACT

The present invention relates to a radio access system that supports an unlicensed band, and provides methods for controlling a contention window size (CWS) for performing uplink LBT, methods for effectively utilizing a radio resource even when an uplink data transmission fails, and apparatuses supporting the same. As an embodiment of the present invention, a method for controlling a contention window size (CWS) for transmitting uplink data in a radio access system supporting an unlicensed band by a user equipment, may comprise the steps of: receiving, from an evolved node B, a radio signal including CSW control information indicating information required for controlling a CWS; controlling the CWS on the basis of the CWS control information; performing a listen before talk (LBT) process using the controlled CWS; and transmitting uplink data when a result of the LBT process shows that an unlicensed band is in an idle state.

6 Claims, 26 Drawing Sheets

(51) Int. Cl.
  *H04L 1/18* (2006.01)
  *H04L 1/00* (2006.01)
  *H04W 74/08* (2009.01)
  *H04W 16/14* (2009.01)
  *H04W 84/12* (2009.01)

(52) U.S. Cl.
  CPC ......... *H04L 1/1861* (2013.01); *H04W 74/006* (2013.01); *H04W 74/0816* (2013.01); *H04L 1/0003* (2013.01); *H04L 1/0009* (2013.01); *H04W 16/14* (2013.01); *H04W 74/0808* (2013.01); *H04W 84/12* (2013.01)

(58) Field of Classification Search
  CPC .... H04W 84/12; H04L 1/0038; H04L 1/1822; H04L 1/1861; H04L 1/0003; H04L 1/0009
  See application file for complete search history.

(56) References Cited

OTHER PUBLICATIONS

Samsung: "Performance of frequency reuse for different CW adaptation schemes", R1-154141, 3GPP TSG RAN WG1 Meeting #82, Beijing, China, Aug. 24-28, 2015.
Intel Corporation: "On the LAA UL: LBT, scheduling, and subframe structure", R1-152649, 3GPP TSG RAN WG1 Meeting #81, Fukuoka, Japan, May 25-29, 2015.

* cited by examiner

PUCCH format 1a and 1b structure (normal CP case)

PUCCH format 1a and 1b structure (extended CP case)

PUCCH format 2, 2a, and 2b structure (normal CP case)

PUCCH format 2, 2a, and 2b structure (extended CP case)

FIG. 10 resource allocation: 18 ACK/NACK channels in normal CP

| cell-specific cyclic shift offset | | RS orthogonal cover | | | ACK/NACK orthogonal cover | | |
|---|---|---|---|---|---|---|---|
| $\delta_{offset}^{PUCCH}=1$ | $\delta_{offset}^{PUCCH}=0$ | $\bar{n}_{OC}=0$ | $\bar{n}_{OC}=1$ | $\bar{n}_{OC}=2$ | $n_{OC}=0$ | $n_{OC}=1$ | $n_{OC}=2$ |
| $n_{CS}=1$ | $n_{CS}=0$ | n' = 0 | | 12 | n' = 0 | | 12 |
| 2 | 1 | | 6 | | | 6 | |
| 3 | 2 | | | 13 | | | 13 |
| 4 | 3 | 1 | | | 1 | | |
| 5 | 4 | | 7 | | | 7 | |
| 6 | 5 | | | 14 | | | 14 |
| 7 | 6 | 2 | | | 2 | | |
| 8 | 7 | | 8 | | | 8 | |
| 9 | 8 | | | 15 | | | 15 |
| 10 | 9 | 3 | | | 3 | | |
| 11 | 10 | | 9 | | | 9 | |
| 0 | 11 | | | 16 | | | 16 |
| | | 4 | | | 4 | | |
| | | | 10 | | | 10 | |
| | | | | 17 | | | 17 |
| | | 5 | | | 5 | | |
| | | | 11 | | | 11 | |

$\Delta_{shift}^{PUCCH} \in \{1,2,3\}$ normal CP case
$\{1,2,3\}$ extended CP case $\delta_{offset}^{PUCCH} \in \{0,1,...,\Delta_{shift}^{PUCCH}-1\}$ specific cyclic shift offset $n_{OC}$ : orthogonal sequence index for ACK/NACK
$\bar{n}_{OC}$ : orthogonal sequence index for RS
$n_{CS}$ : cyclic shift value of CAZAC sequence
$n'$ : ACK/NACK resource index used for channelizing in RB cell-specific cyclic shift
value of CAZAC sequence FIG. 19
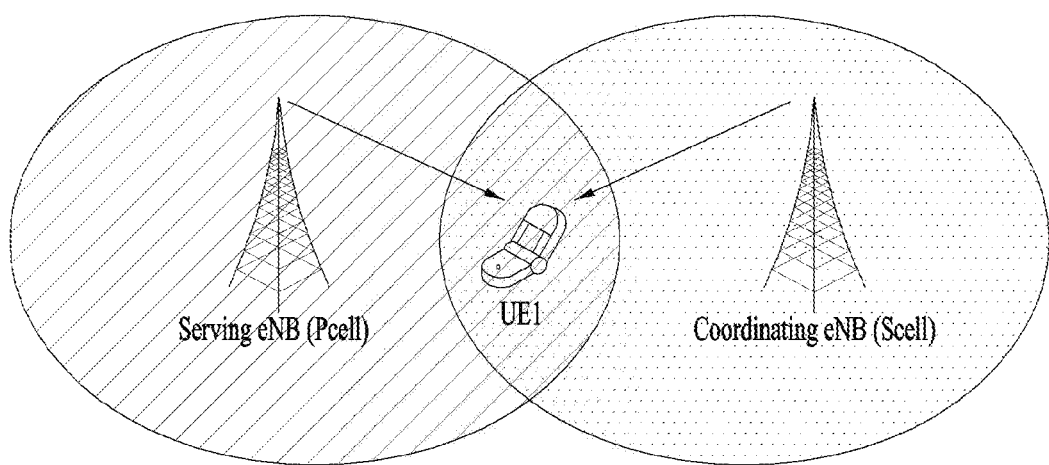
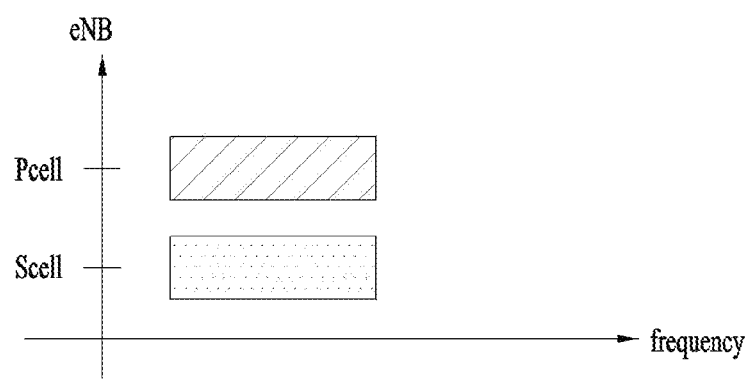

FIG. 25
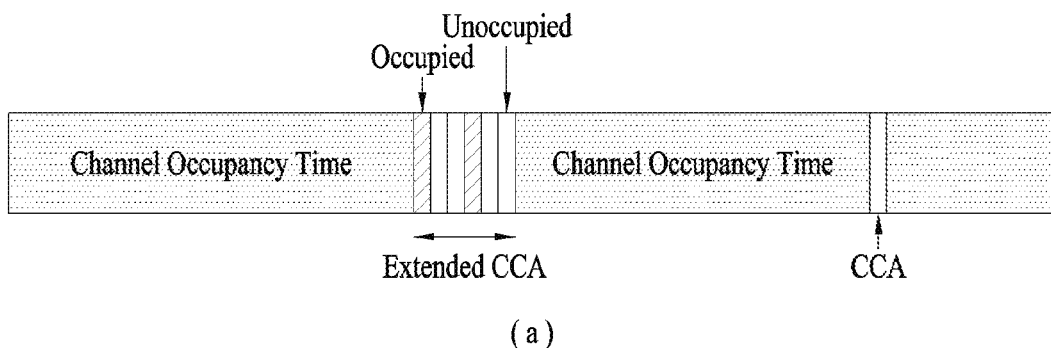
(a)
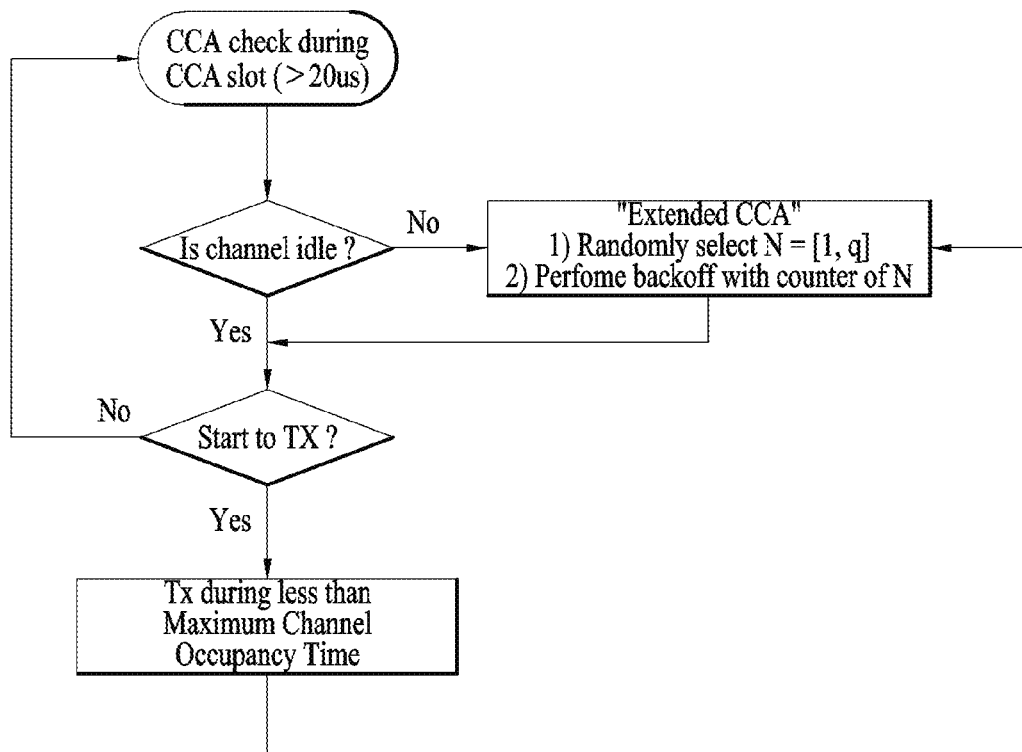
(b)

METHOD AND APPARATUS FOR CONTROLLING CONTENTION WINDOW SIZE IN RADIO ACCESS SYSTEM SUPPORTING UNLICENSED BAND

This application is a 35 USC § 371 National Stage entry of International Application No. PCT/KR2016/009185, filed on Aug. 19, 2016, and claims priority to U.S. Provisional Application No. 62/207,904, filed on Aug. 20, 2015, and U.S. Provisional Application No. 62/281,150, filed on Jan. 20, 2016 all of which are incorporated by reference in their entirety herein.

TECHNICAL FIELD

The present invention relates to a wireless access system supporting an unlicensed band, and more particularly, to methods of controlling a CWS (contention window size) for performing uplink LBT (listen before talk), methods of efficiently utilizing a radio resource even when an uplink data transmission fails, and an apparatus therefor.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Tasks

An object of the present invention is to provide a method of efficiently transmitting and receiving a data in a wireless access system supporting an unlicensed band.

Another object of the present invention is to provide a method of performing LBT for transmitting an uplink data in an unlicensed band.

Another object of the present invention is to provide methods of controlling/adjusting a CWS value for performing LBT.

Another object of the present invention is to provide methods of efficiently using a radio resource even when an uplink data transmission fails due to an LBT failure.

The other object of the present invention is to provide an apparatus supporting the abovementioned methods.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention relates to a wireless access system supporting an unlicensed band, and more particularly, to methods of controlling a CWS (contention window size) for performing uplink LBT (listen before talk), methods of efficiently utilizing a radio resource even when an uplink data transmission fails, and an apparatus therefor.

To achieve these and other advantages and in accordance with the purpose of the present invention, as embodied and broadly described, according to one embodiment, a method of adjusting a CWS (contention window size), which is controlled by a UE (user equipment) to transmit uplink data in a wireless access system supporting an unlicensed band, includes the steps of receiving a radio signal including CWS adjust information corresponding to information necessary for controlling the CWS from an eNB, adjusting the CWS based on the CWS adjust information, performing an LBT (listen before talk) process using the controlled CWS, and if the unlicensed band is in an idle state as a result of the LBT process, transmitting the uplink data.

To further achieve these and other advantages and in accordance with the purpose of the present invention, according to a different embodiment, a UE (user equipment) adjusting a CWS (contention window size) to transmit uplink data in a wireless access system supporting an unlicensed band includes a transmitter, a receiver, and a processor, the processor configured to control the receiver to receive a radio signal including CWS adjust information corresponding to information necessary for adjusting a CWS from the eNB, the processor configured to adjust the CWS based on the CWS adjust information, the processor configured to control the transmitter and the receiver to perform an LBT (listen before talk) process using the adjusted CWS, the processor, if an unlicensed band is in an idle state as a result of the LBT process, configured to control the transmitter to transmit the uplink data.

In the embodiments of the present invention, the radio signal may correspond to one selected from the group consisting of a scheduling grant, a common PDCCH (physical downlink control channel), a PHICH (physical HARQ-ACK indication channel), and a higher layer signal.

And, the CWS adjust information can indicate a priority class for the UE.

In this case, the CWS adjust information may correspond to an LBT parameter connected to the priority class for the UE. For example, the LBT parameter may correspond to either a CWS parameter or an MCOT (maximum channel occupancy time) parameter.

Or, the CWS adjust information includes one of a HARQ process number and the number of subframes scheduled to the UE and the HARQ process number and the number of subframes can be connected to the priority class for the UE.

It is to be understood that both the foregoing general description and the following detailed description of the present disclosure are exemplary and explanatory and are intended to provide further explanation of the disclosure as claimed.

Advantageous Effects

The embodiments of the present disclosure have the following effects.

First of all, it is able to efficiently transmit and receive a data in a wireless access system supporting an unlicensed band.

Second, it is able to efficiently perform an LBT process for transmitting an uplink data in an unlicensed band.

Third, it is able to appropriately perform LBT in accordance with a channel state by controlling a CWS value for performing the LBT.

Fourth, it is able to efficiently use a radio resource in a base station even when an uplink data transmission fails due to an LBT failure, thereby increasing overall data process amount.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 10 is a view illustrating Acknowledgment/Negative Acknowledgment (ACK/NACK) channelization for PUCCH formats 1a an 1b;

FIG. 19 is a conceptual view illustrating a Coordinated Multi-Point (CoMP) system operating in a CA environment;

FIG. 25 is a view illustrating an exemplary Load Based Equipment (LBE) operation as one of the LBT operations;

BEST MODE

Mode for Invention

Figure 1:
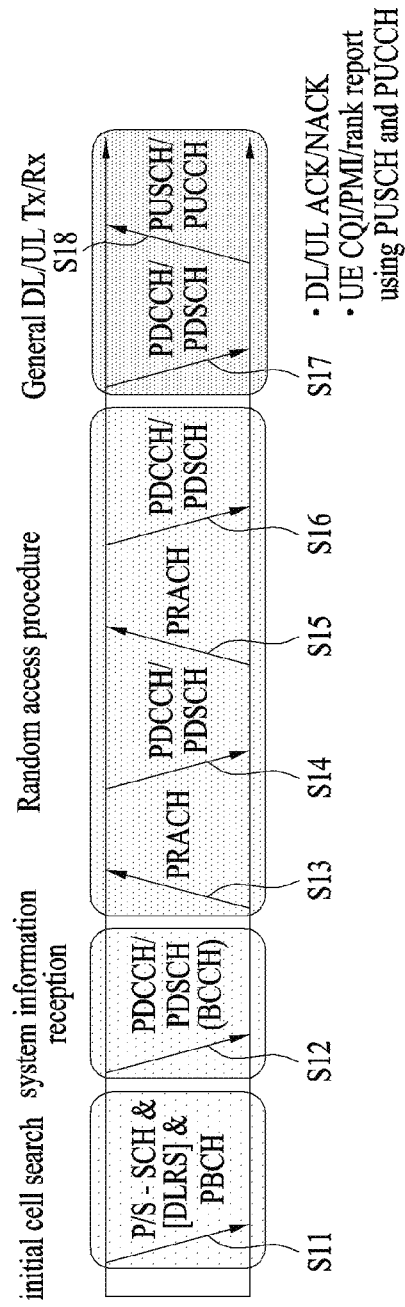
FIG. 1 is a view illustrating physical channels and a signal transmission method using the physical channels.

Embodiments of the present invention described in the following in detail relate to a wireless access system supporting an unlicensed band. The embodiments of the present invention provide methods of controlling a CWS (contention window size) for performing uplink LBT, methods of efficiently utilizing a radio resource even when an uplink data transmission fails, and apparatuses supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical feature and scope of the present disclosure.

For example, the term Transmission Opportunity Period (TxOP) is interchangeable with transmission period, Transmission (Tx) burst, or Reserved Resource Period (RRP). Further, a Listen Before Talk (LBT) operation may be performed for the same purpose as that of carrier sensing for determining whether a channel is in an idle state, Clear Channel Assessment (CCA), and a Channel Access Procedure (CAP).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (WiFi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
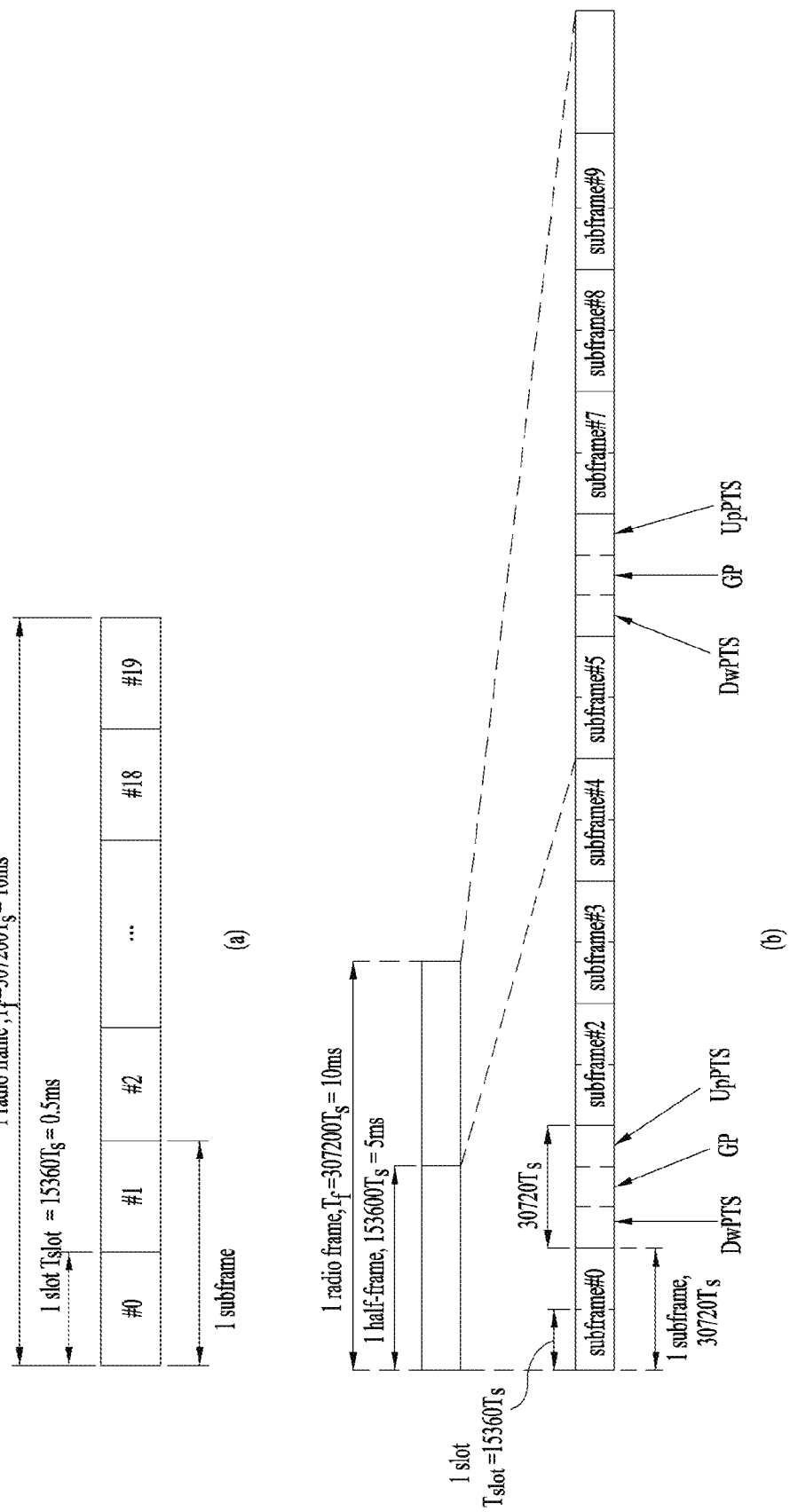
FIG. 2 is a view illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

Figure 3:
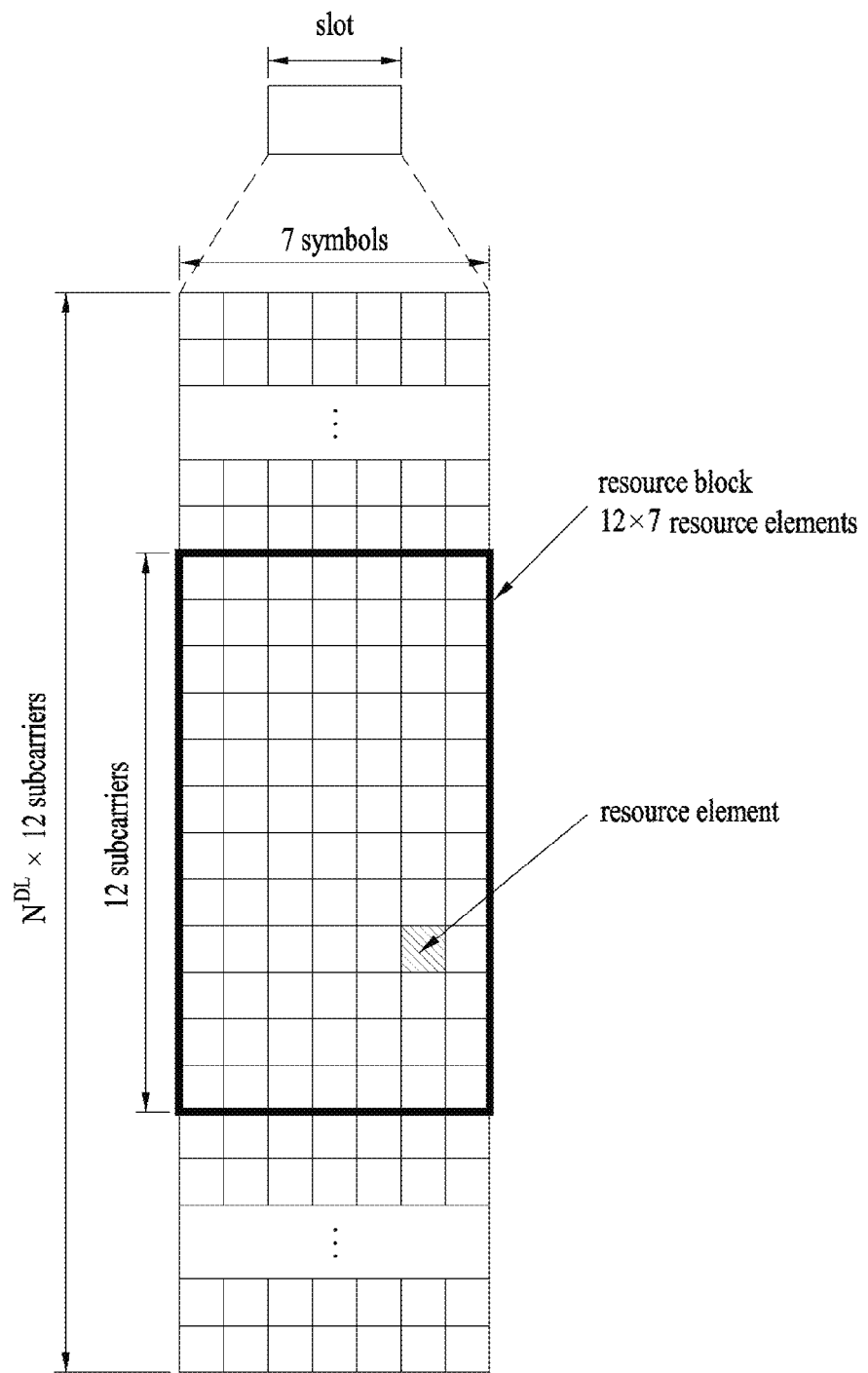
FIG. 3 is a view illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
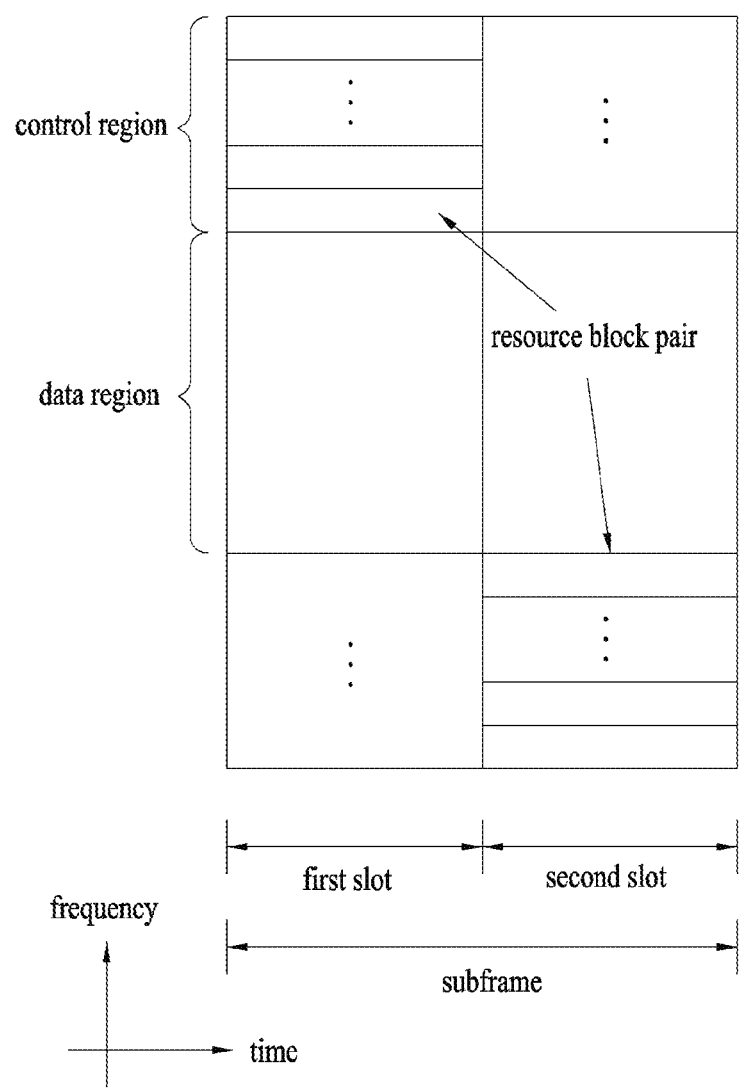
FIG. 4 is a view illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
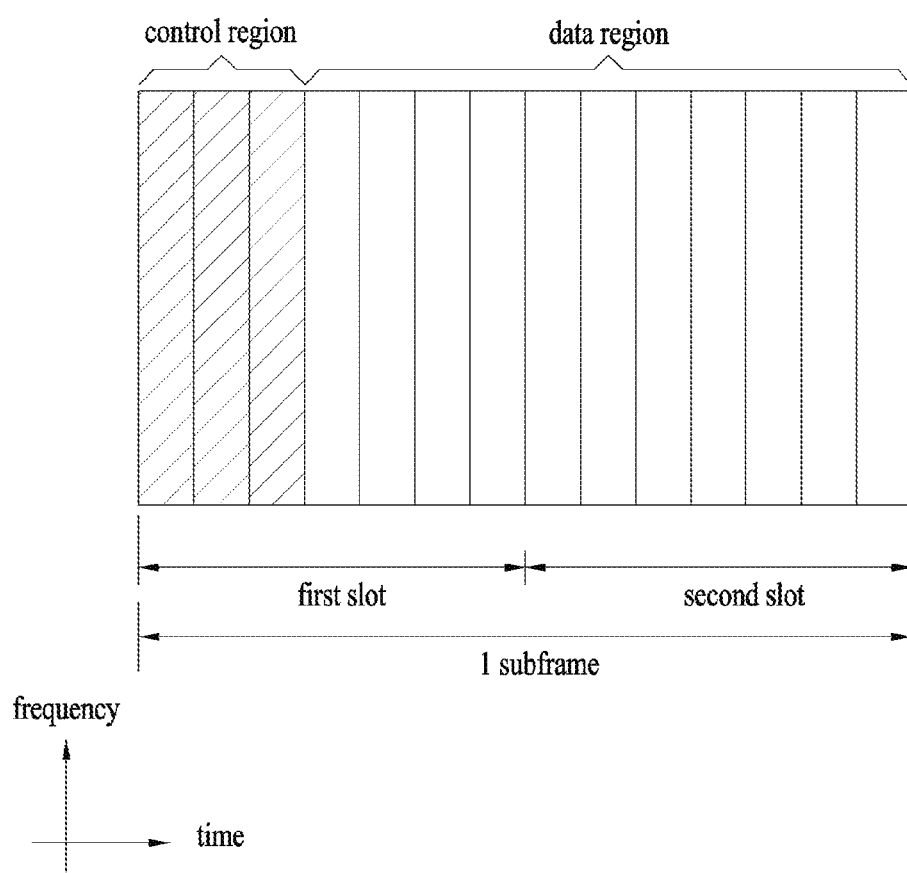
FIG. 5 is a view illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE (=$\lfloor$REG/9$\rfloor$) and the CCEs are indexed from 0 to NCCE−1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for PUSCH transmissions (uplink) |
| Format 1 | Resource assignments for single codeword PDSCH transmission (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO(mode 5) |
| Format 2 | Resource assignments for PDSCH for closed loop MIMO operation (mode 4) |
| Format 2A | resource assignments for PDSCH for open loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode 9: Precoding supporting up to eight layers, which are not based on a codebook (Rel-10); and
(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE NCCE,k−1. NCCE,k is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting position of a USS.

[Table 4] illustrates the sizes of CSSs and USSs.

TABLE 4

| PDCCH Format | Number of CCE (n) | Number of candidates in CSS | Number of candidates in USS |
| --- | --- | --- | --- |
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An $SS_k^{(L)}$ is a PDCCH candidate set with a CCE aggregation level $L \in \{1, 2, 4, 8\}$. The CCEs of PDCCH candidate set m in the SS may be determined by the following equation.

$$L \cdot \{(Y_k+m) \bmod \lfloor N_{CCE,k}/L \rfloor\}+i \quad \text{[Equation 1]}$$

Herein, $M^{(L)}$ is the number of PDCCH candidates with CCE aggregation level L to be monitored in the SS, m=0, Λ, $M^{(L)}$−1, i is the index of a CCE in each PDCCH candidate, and i=0, Λ, L−1. $k=\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ Aggregation level L | Size [in CCEs] | Number of PDCCH candidates $M^{(L)}$ |
| --- | --- | --- | --- |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \bmod D \quad \text{[Equation 2]}$$

Herein, $Y_{-1}=n_{RNTI} \neq 0$, $n_{RNTI}$ indicating an RNTI value. A=39827 and D=65537.

1.3. PUCCH (Physical Uplink Control Channel)

PUCCH may include the following formats to transmit control information.

(1) Format 1: On-Off keying (OOK) modulation, used for SR (Scheduling Request)

(2) Format 1a & 1b: Used for ACK/NACK transmission
1) Format 1a: BPSK ACK/NACK for 1 codeword
2) Format 1b: QPSK ACK/NACK for 2 codewords (3) Format 2: QPSK modulation, used for CQI transmission (4) Format 2a & Format 2b: Used for simultaneous transmission of CQI and ACK/NACK (5) Format 3: Used for multiple ACK/NACK transmission in a carrier aggregation environment

[Table 6] shows a modulation scheme according to PUCCH format and the number of bits per subframe. Table 7 shows the number of reference signals (RS) per slot according to PUCCH format. Table 8 shows SC-FDMA symbol location of RS (reference signal) according to PUCCH format. In Table 6, PUCCH format 2a and PUCCH format 2b correspond to a case of normal cyclic prefix (CP).

TABLE 6

| PUCCH format | Modulation scheme | No. of bits per subframe, Mbit |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

TABLE 7

| PUCCH format | Normal CP | Extended CP |
| --- | --- | --- |
| 1, 1a, 1b | 3 | 2 |
| 2, 3 | 2 | 1 |
| 2a, 2b | 2 | N/A |

TABLE 8

| PUCCH format | SC-FDMA symbol location of RS Normal CP | Extended CP |
| --- | --- | --- |
| 1, 1a, 1b | 2, 3, 4 | 2, 3 |
| 2, 3 | 1, 5 | 3 |
| 2a, 2b | 1, 5 | N/A |

Figure 6:
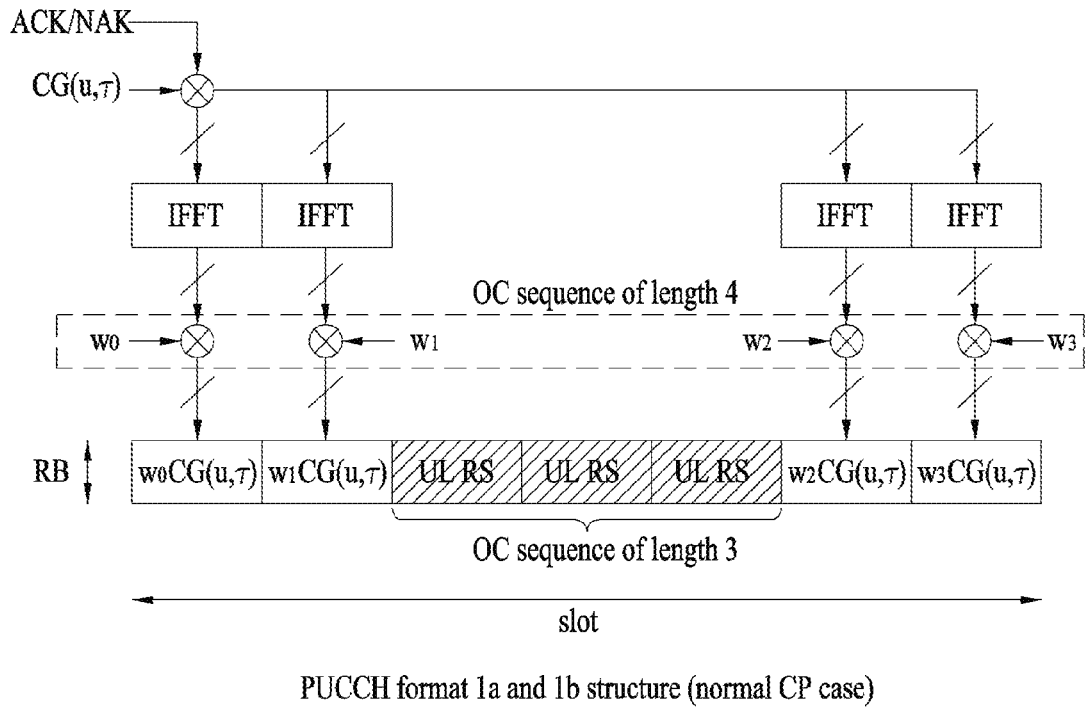
FIG. 6 is a view illustrating Physical Uplink Control Channel (PUCCH) formats 1a and 1b in a normal Cyclic Prefix (CP) case.
Figure 7:
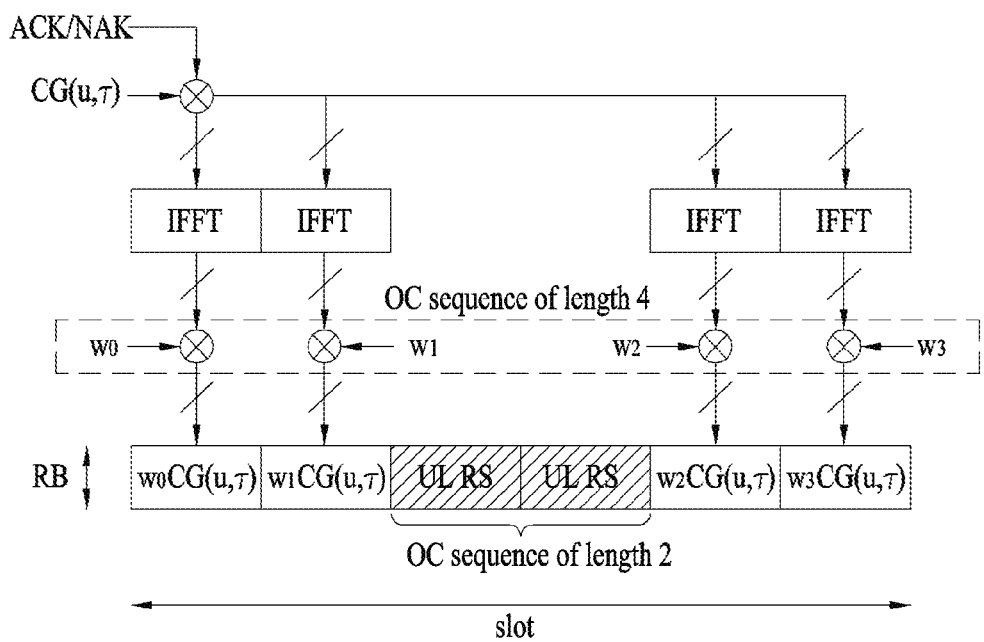
FIG. 7 is a view illustrating PUCCH formats 1a and 1b in an extended CP case.

FIG. 6 shows PUCCH formats 1a and 1b in case of a normal cyclic prefix. And, FIG. 7 shows PUCCH formats 1a and 1b in case of an extended cyclic prefix.

According to the PUCCH formats 1a and 1b, control information of the same content is repeated in a subframe by slot unit. In each UE, ACK/NACK signal is transmitted on a different resource constructed with a different cyclic shift (CS) (frequency domain code) and an orthogonal cover (OC) or orthogonal cover code (OCC) (time domain spreading code) of CG-CAZAC (computer-generated constant amplitude zero auto correlation) sequence. For instance, the OC includes Walsh/DFT orthogonal code. If the number of CS and the number of OC are 6 and 3, respectively, total 18

UEs may be multiplexed within the same PRB (physical resource block) with reference to a single antenna. Orthogonal sequences w0, w1, w2 and w3 may be applicable to a random time domain (after FFT modulation) or a random frequency domain (before FFT modulation).

For persistent scheduling with SR, ACK/NACK resource constructed with CS, OC and PRB (physical resource block) may be allocated to a UE through RRC (radio resource control. For non-persistent scheduling with dynamic ACK/NACK, the ACK/NACK resource may be implicitly allocated to a UE using a smallest CCE index of PDCCH corresponding to PDSCH.

Length-4 orthogonal sequence (OC) and length-3 orthogonal sequence for PUCCH format 1/1a/1b are shown in Table 9 and Table 10, respectively.

TABLE 9

| Sequence index $n_{oc}$ ($n_s$) | Orthogonal sequences $[w(0) \Lambda \; w(N_{SF}^{PUCCH} - 1)]$ |
| --- | --- |
| 0 | [+1 +1 +1 +1] |
| 1 | [+1 −1 +1 −1] |
| 2 | [+1 −1 −1 +1] |

TABLE 10

| Sequence index $n_{oc}$ ($n_s$) | Orthogonal sequences $[w(0) \Lambda \; w(N_{SF}^{PUCCH} - 1)]$ |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Orthogonal sequence (OC) $[\overline{w}(0) \Lambda \; \overline{w}(N_{RS}^{PUCCH}-1)]$ for a reference signal in PUCCH format 1/1a/1b is shown in Table 11.

TABLE 11

| Sequence index $\overline{n}_{oc}$ ($n_s$) | Normal cyclic prefix | Extended cyclic prefix |
| --- | --- | --- |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Figure 8:
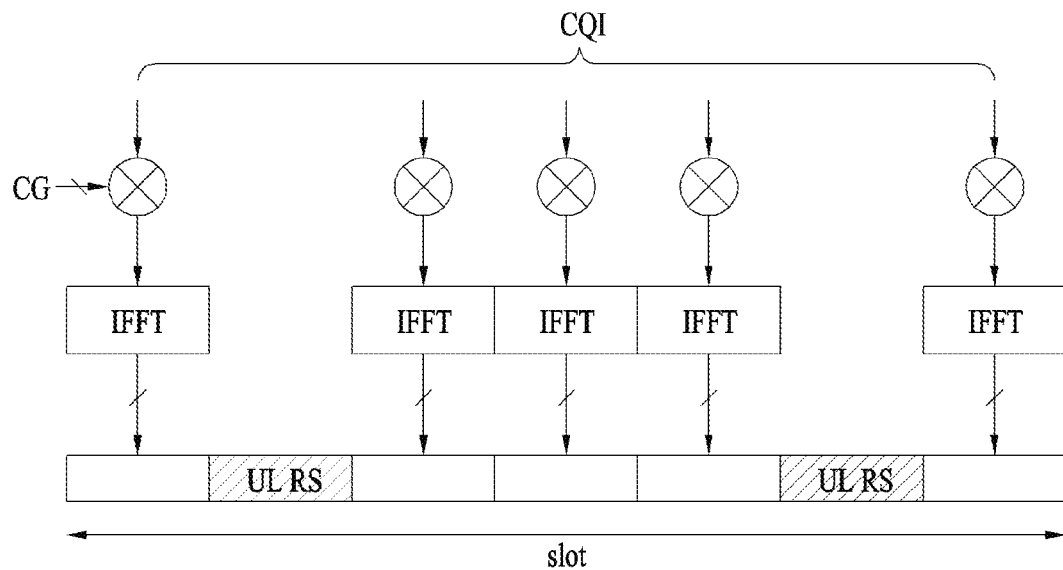
FIG. 8 is a view illustrating PUCCH format 2/2a/2b in the normal CP case.

FIG. 8 shows PUCCH format 2/2a/2b in case of a normal cyclic prefix. And, FIG. 9 shows PUCCH format 2/2a/2b in case of an extended cyclic prefix.

Figure 9:
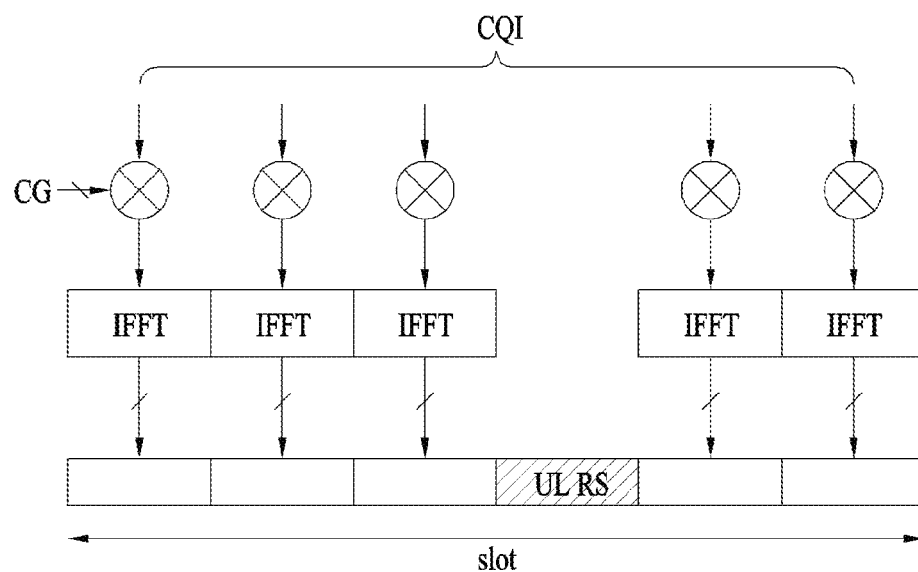
FIG. 9 is a view illustrating PUCCH format 2/2a/2b in the extended CP case.

Referring to FIG. 8 and FIG. 9, in case of a normal CP, a subframe is constructed with 10 QPSK data symbols as well as RS symbol. Each QPSK symbol is spread in a frequency domain by CS and is then mapped to a corresponding SC-FDMA symbol. SC-FDMA symbol level CS hopping may be applied to randomize inter-cell interference. The RS may be multiplexed by CDM using a cyclic shift. For instance, assuming that the number of available CSs is 12, 12 UEs may be multiplexed in the same PRB. For instance, assuming that the number of available CSs is 6, 6 UEs may be multiplexed in the same PRB. In brief, a plurality of UEs in PUCCH format 1/1a/1b and PUCCH format 2/2a/2b may be multiplexed by 'CS+OC+PRB' and 'CS+PRB', respectively.

FIG. 10 is a diagram of ACK/NACK channelization for PUCCH formats 1a and 1b. In particular, FIG. 10 corresponds to a case of 'Δshift PUCCH=2'

Figure 11:
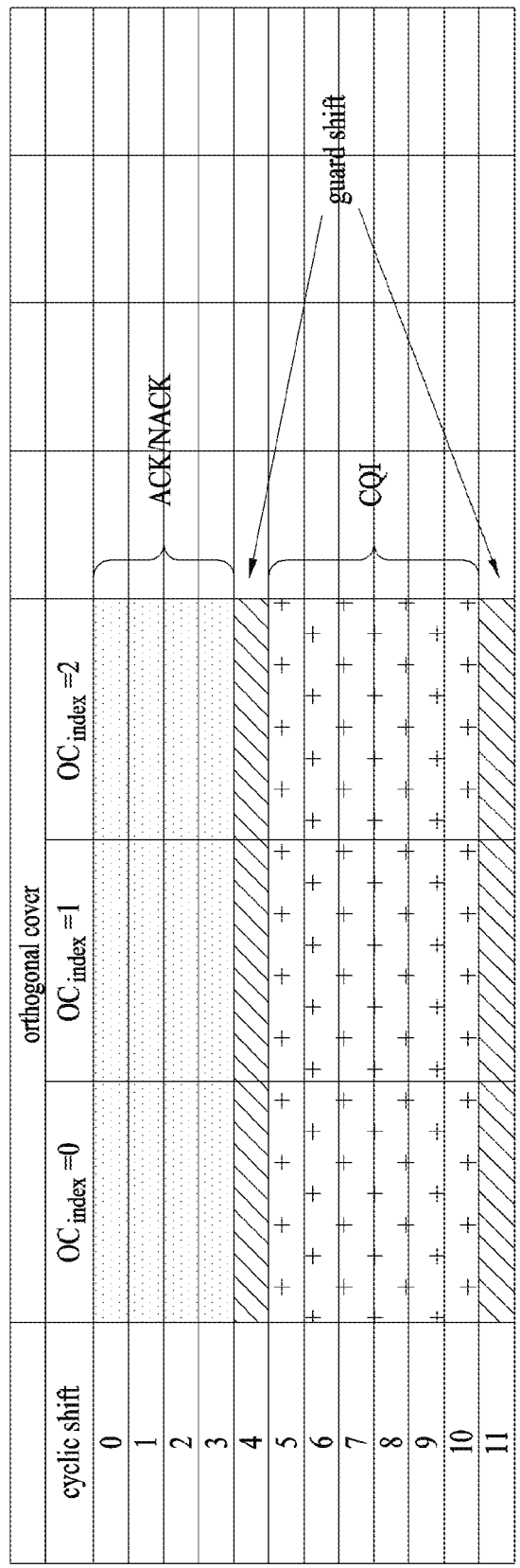
FIG. 11 is a view illustrating channelization for a hybrid structure of PUCCH format 1a/1b and PUCCH format 2/2a/2b in the same Physical Resource Block (PRB)

FIG. 11 is a diagram of channelization for a hybrid structure of PUCCH format 1/1a/1b and PUCCH format 2/2a/2b.

Cyclic shift (CS) hopping and orthogonal cover (OC) remapping may be applicable in a following manner.

(1) Symbol-based cell-specific CS hopping for randomization of inter-cell interference (2) Slot level CS/OC remapping
  1) For inter-cell interference randomization
  2) Slot based access for mapping between ACK/NACK channel and resource (k)

Meanwhile, resource nr for PUCCH format 1/1a/1b may include the following combinations.

(1) CS (=equal to DFT orthogonal code at symbol level) (ncs)
(2) OC (orthogonal cover at slot level) (noc)
(3) Frequency RB (Resource Block) (nrb)

If indexes indicating CS, OC and RB are set to ncs, noc, nrb, respectively, a representative index nr may include ncs, noc and nrb. In this case, the nr may meet the condition of 'nr=(ncs, noc, nrb)'.

The combination of CQI, PMI, RI, CQI and ACK/NACK may be delivered through the PUCCH format 2/2a/2b. And, Reed Muller (RM) channel coding may be applicable.

For instance, channel coding for UL (uplink) CQI in LTE system may be described as follows. First of all, bitstreams $a_0, a_1, a_2, a_3, \ldots, a_{A-1}$ may be coded using (20, A) RM code. In this case, $a_0$ and $a_{A-1}$ indicates MSB (Most Significant Bit) and LSB (Least Significant Bit), respectively. In case of an extended cyclic prefix, maximum information bits include 11 bits except a case that QI and ACK/NACK are simultaneously transmitted. After coding has been performed with 20 bits using the RM code, QPSK modulation may be applied. Before the BPSK modulation, coded bits may be scrambled.

Table 12 shows a basic sequence for (20, A) code.

TABLE 12

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
| --- | --- | --- | --- | --- | --- | --- | --- | --- | --- | --- | --- | --- | --- |
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 1 | 0 | 1 | 1 | 1 | 1 |
| 4 | 1 | 1 | 1 | 1 | 0 | 0 | 1 | 0 | 0 | 1 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 0 | 1 | 0 | 1 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |

TABLE 12-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3, \ldots, b_{B-1}$ may be generated by [Equation 31].

$$b_i = \sum_{n=0}^{A-1} (a_n \cdot M_{i,n}) \mod 2 \qquad \text{[Equation 3]}$$

In [Equation 3], i=0, 1, 2, . . . , B−1' is met.

In case of wideband repots, a bandwidth of UCI (uplink control information) field for CQI/PMI can be represented as Tables 8 to 10 in the following.

[Table 13] shows UCI (Uplink Control Information) field for broadband report (single antenna port, transmit diversity) or open loop spatial multiplexing PDSCH CQI feedback.

TABLE 13

| Field | Bandwidth |
|---|---|
| Wideband CQI | 4 |

[Table 14] shows UL control information (UCI) field for CQI and PMI feedback in case of wideband reports (closed loop spatial multiplexing PDSCH transmission).

TABLE 14

| | Bandwidth | | | |
|---|---|---|---|---|
| | 2 antenna ports | | 4 antenna ports | |
| Field | rank = 1 | rank = 2 | rank = 1 | Rank > 1 |
| Wideband CQI | 4 | 4 | 4 | 4 |
| Spatial differential CQI | 0 | 3 | 0 | 3 |
| Precoding Matrix Indication | 2 | 1 | 4 | 4 |

[Table 15] shows UL control information (UCI) field for RI feedback in case of wideband reports.

TABLE 15

| | Bit widths | | |
|---|---|---|---|
| | | 4 antenna ports | |
| Field | 2 antenna ports | Max. 2 layers | Max. 4 layers |
| Rank Indication | 1 | 1 | 2 |

Figure 12:
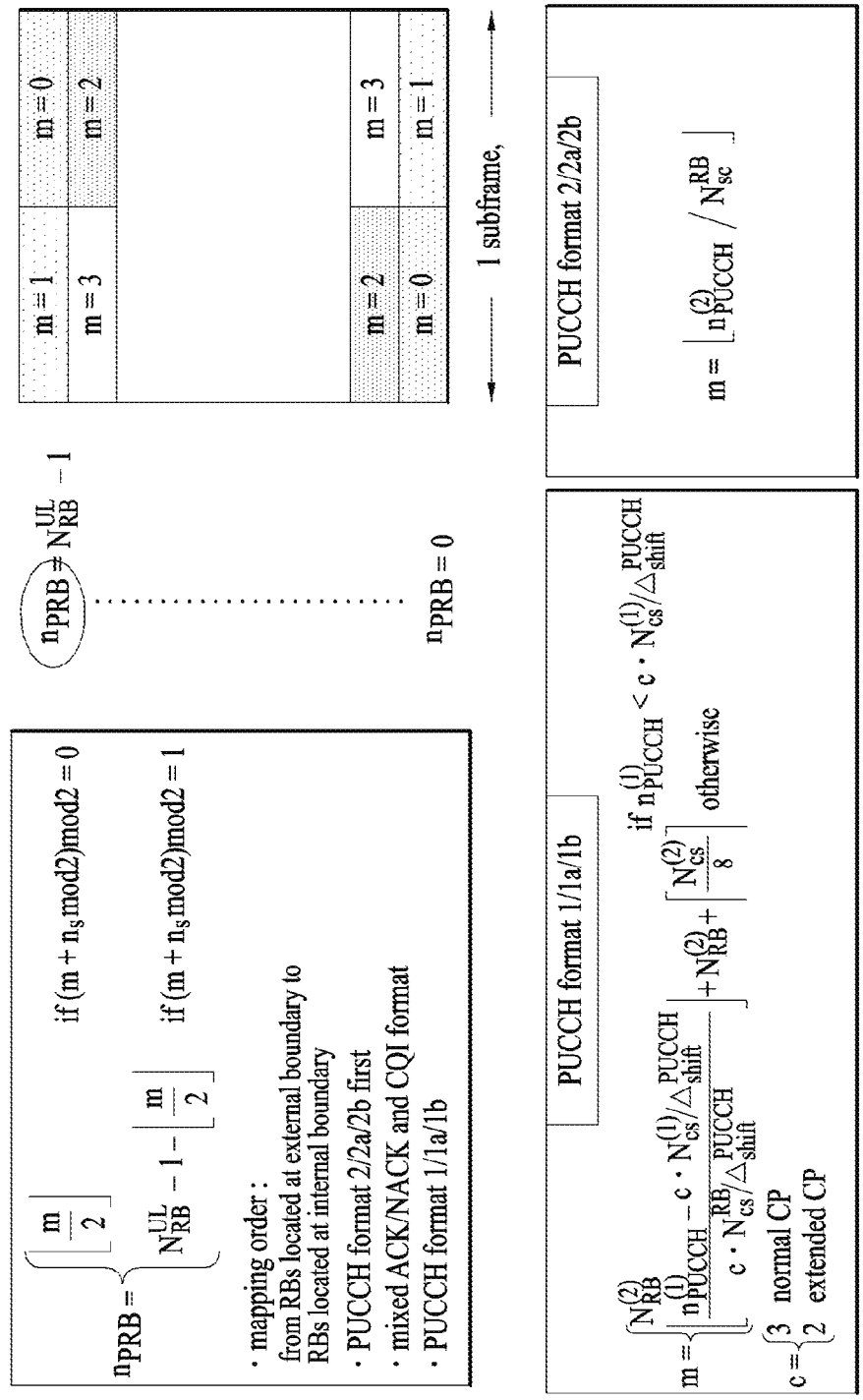
FIG. 12 is a view illustrating a PRB allocation method.
Figure 20:
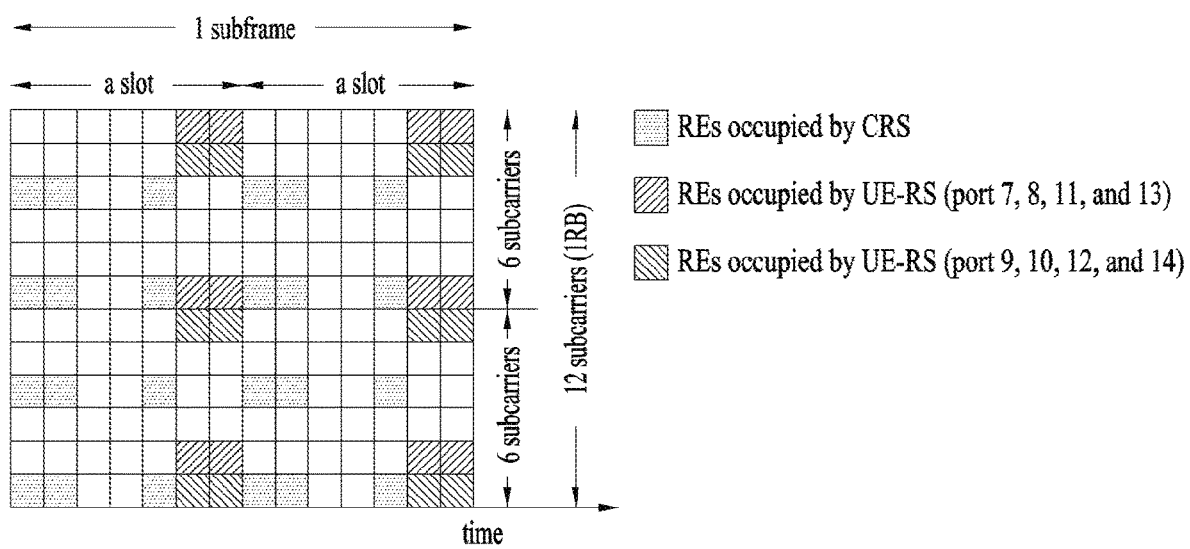
FIG. 20 is a view illustrating an exemplary subframe to which User Equipment (UE)-specific Reference Signals (RSs) (UE-RSs) are allocated, which may be used in embodiments of the present disclosure.

FIG. 12 is a diagram for PRB allocation. Referring to FIG. 20, PRB may be usable for PUCCH transmission in a slot ns.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 13:
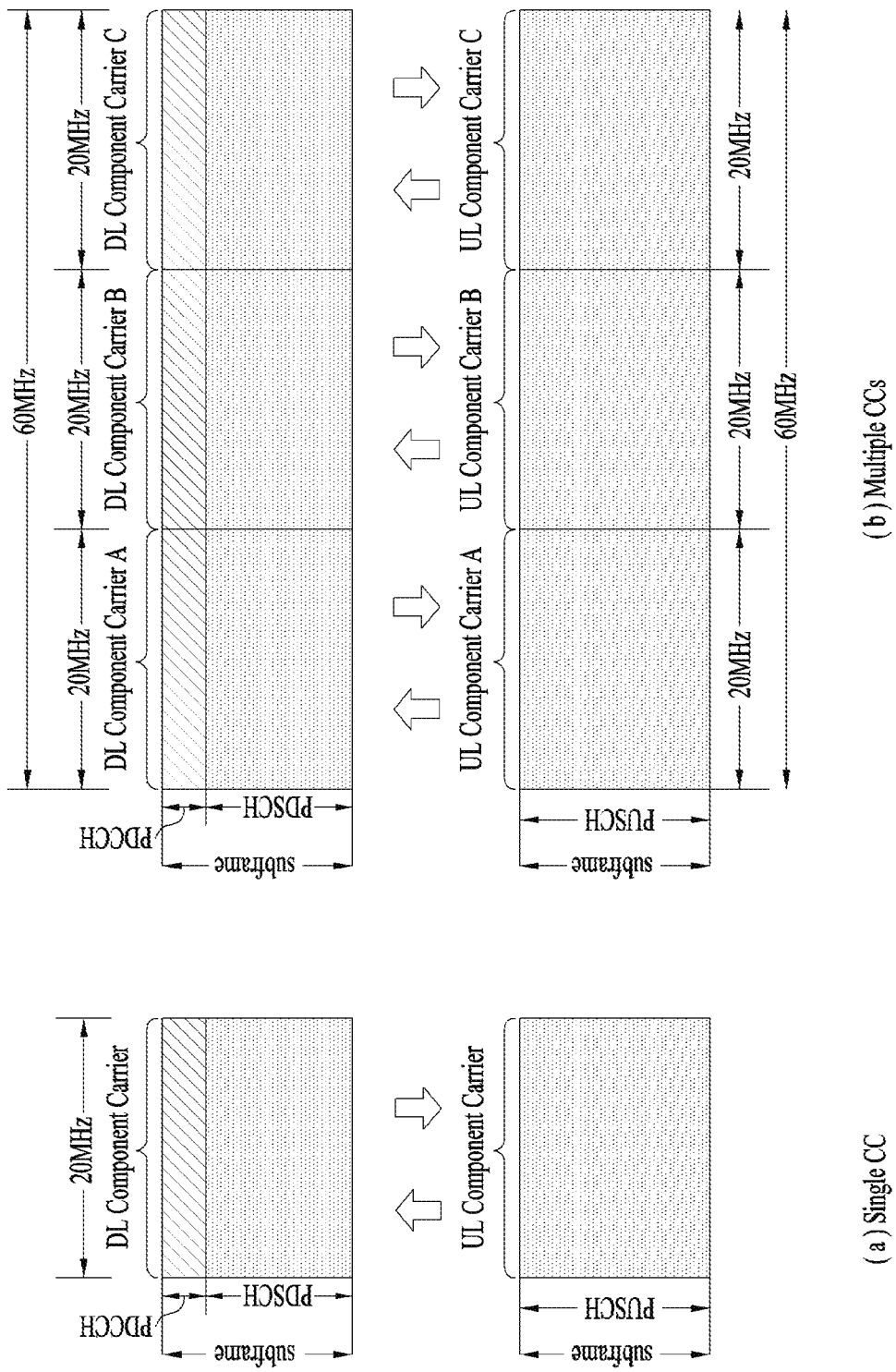
FIG. 13 is a view illustrating exemplary Component Carriers (CCs) and exemplary Carrier Aggregation (CA) in a Long Term Evolution-Advanced (LTE-A) system, which are used in embodiments of the present disclosure.

FIG. 13 illustrates an example of CCs and CA in the LTE-A system, which are used in embodiments of the present disclosure.

FIG. 13(a) illustrates a single carrier structure in the LTE system. There are a DL CC and a UL CC and one CC may have a frequency range of 20 MHz.

FIG. 13(b) illustrates a CA structure in the LTE-A system. In the illustrated case of FIG. 13(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M<N) DL CCs to a UE. The UE may monitor only the M DL CCs and receive a DL signal in the M DL CCs. The network may prioritize L (L<M<N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 14:
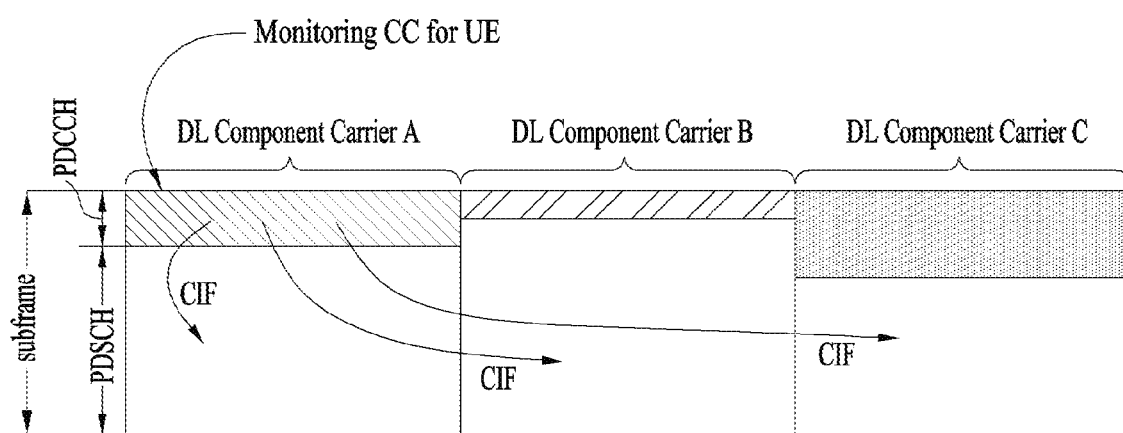
FIG. 14 is a view illustrating a subframe structure based on cross-carrier scheduling in the LTE-A system, which is used in embodiments of the present disclosure.

FIG. 14 illustrates a cross carrier-scheduled subframe structure in the LTE-A system, which is used in embodiments of the present disclosure.

Referring to FIG. 14, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 15:
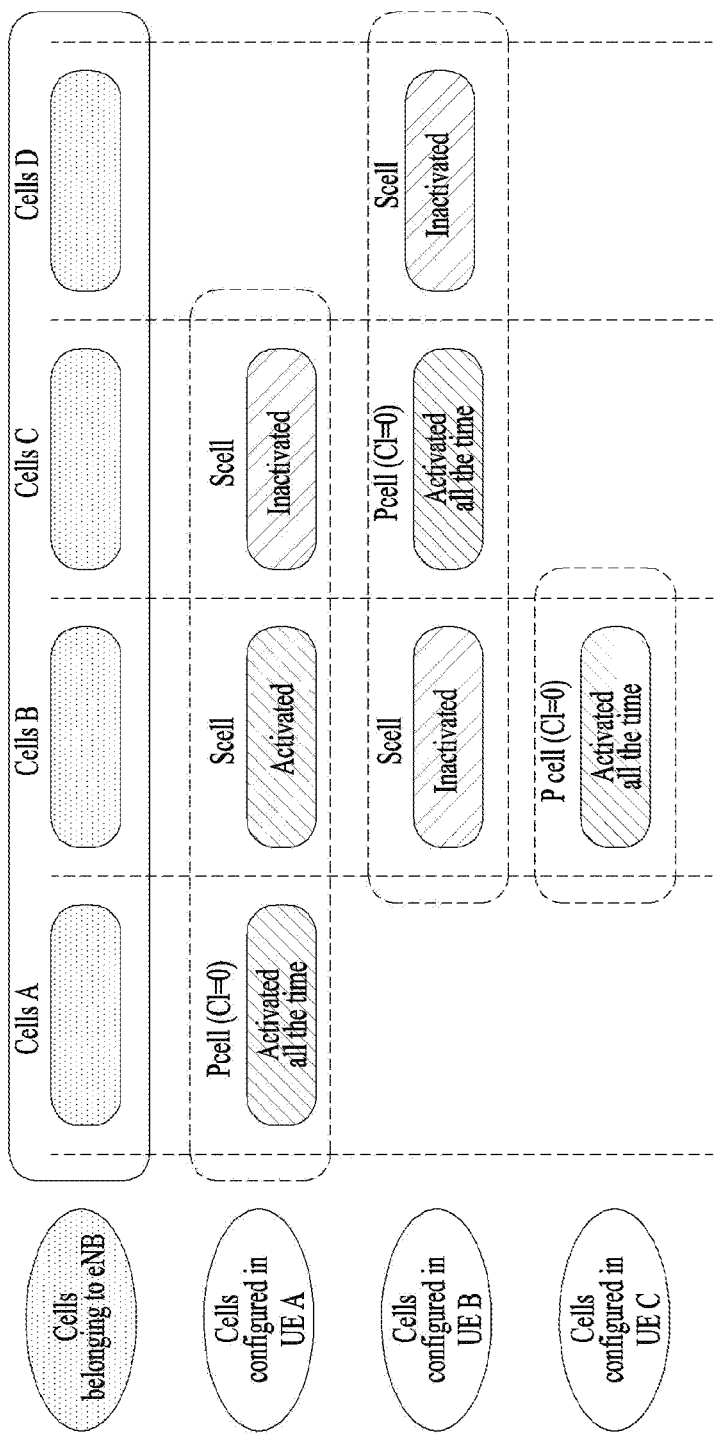
FIG. 15 is a view illustrating an exemplary configuration of serving cells according to cross-carrier scheduling used in embodiments of the present disclosure.

FIG. 15 is conceptual diagram illustrating a construction of serving cells according to cross-carrier scheduling.

Referring to FIG. 15, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of P Cell. In this case, P Cell is always activated, and SCell may be activated or deactivated by the eNB and/or UE.

The cells shown in FIG. 15 may be configured per UE. The abovementioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

2.3 Channel State Information (CSI) Feedback on PUCCH

First of all, in the 3GPP LTE system, when a DL reception entity (e.g., UE) is connected to a DL transmission entity (e.g., BS), the DL reception entity performs measurement on a Reference Signal Received Power (RSRP) of a reference signal transmitted in DL, a quality of a reference signal (RSRQ: Reference Signal Received Quality) and the like at a random time and is then able to make a periodic or even-triggered report of a corresponding measurement result to the BS.

Each UE reports a DL channel information in accordance with a DL channel status via uplink. A base station is then able to determine time/frequency resources, MCS (modulation and coding scheme) and the like appropriate for a data transmission to each UE using the DL channel information received from the each UE.

Such Channel State Information (CSI) may include Channel Quality Indicator (CQI), Precoding Matrix Indicator (PMI), Precoder Type Indication (PTI) and/or Rank Indication (RI). In particular, the CSI may be transmitted entirely or partially depending on a transmission mode of each UE. CQI is determined based on a received signal quality of a UE, which may be generally determined on the basis of a measurement of a DL reference signal. In doing so, a CQI value actually delivered to a base station may correspond to an MCS capable of providing maximum performance by maintaining a Block Error Rate (BLER) under 10% in the received signal quality measured by a UE.

This channel information reporting may be classified into a periodic report transmitted periodically and an aperiodic report transmitted in response to a request made by a BS.

In case of the aperiodic report, it is set for each UE by a 1-bit request bit (CQI request bit) contained in UL scheduling information downloaded to a UE by a BS. Having received this information, each UE is then able to deliver channel information to the BS via a Physical Uplink Shared Channel (PUSCH) in consideration of its transmission mode. And, it may set RI and CQI/PMI not to be transmitted on the same PUSCH.

In case of the periodic report, a period for transmitting channel information via an upper layer signal, an offset in the corresponding period and the like are signaled to each UE by subframe unit and channel information in consideration of a transmission mode of each UE may be delivered to a BS via a Physical Uplink Control Channel (PUCCH) in accordance with a determined period. In case that data transmitted in uplink simultaneously exists in a subframe in which channel information is transmitted by a determined period, the corresponding channel information may be transmitted together with the data not on the PUCCH but on a Physical Uplink Shared Channel (PUSCH). In case of the periodic report via PUCCH, bits (e.g., 11 bits) limited further than those of the PUSCH may be used. RI and CQI/PMI may be transmitted on the same PUSCH.

In case that contention occurs between the periodic report and the aperiodic report in the same subframe, only the aperiodic report can be performed.

In calculating Wideband CQI/PMI, a most recently transmitted RI may be usable. RI in a PUCCH CSI report mode is independent from RI in a PUSCH CSI report mode. The RI in the PUSCH CSI report mode is valid for CQI/PMI in the corresponding PUSCH CSI report mode only.

Table 16 is provided to describe CSI feedback type transmitted on PUCCH and PUCCH CSI report mode.

TABLE 16

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-Loop SM)<br>One Wideband CQI (4 bit)<br>when RI > 1, CQI of first codeword | Mode 1-1<br>RI<br>Wideband CQI (4 bit)<br>Wideband spatial CQI (3 bit) for RI > 1<br>Wideband PMI (4 bit) |
| | UE Selected | Mode 2-0<br>RI (only for Open-Loop SM)<br>Wideband CQI (4 bit)<br>Best-1 CQI (4 bit) in each BP<br>Best-1 indicator(L-bit label)<br>when RI > 1, CQI of first codeword | Mode 2-1<br>RI<br>Wideband CQI (4 bit)<br>Wideband spatial CQI (3 bit) for RI > 1<br>Wideband PMI (4 bit)<br>Best-1 CQI (4 bit) 1 in each BP<br>Best-1 spatial CQI (3 bit) for RI > 1<br>Best-1 indicator (L-bit label) |

Referring to [Table 16], in the periodic report of channel information, there are 4 kinds of reporting modes (mode 1-0, mode 1-2, mode 2-0 and mode 2-1) in accordance with CQI and PMI feedback types.

CQI can be classified into WideBand (WB) CQI and SubBand (SB) CQI in accordance with CQI feedback type and PMI can be classified into No PMI or Single PMI in accordance with a presence or non-presence of PMI transmission. In Table 11, No PMI corresponds to a case of Open-Loop (OL), Transmit Diversity (TD) and single-antenna, while Single PMI corresponds to a case of Closed-Loop (CL).

The mode 1-0 corresponds to a case that WB CQI is transmitted in the absence of PMI transmission. In this case, RI is transmitted only in case of OL Spatial Multiplexing (SM) and one WB CQI represented as 4 bits can be transmitted. If RI is greater than 1, CQI for a 1st codeword can be transmitted.

Mode 1-1 corresponds to a case that a single PMI and WB CQI are transmitted. In this case, 4-bit WB CQI and 4-bit WB PMI can be transmitted together with RI transmission. Additionally, if RI is greater than 1, 3-bit WB (wideband) spatial differential CQI can be transmitted. In 2-codeword transmission, the WB spatial differential CQI may indicate a difference value between a WB CQI index for codeword 1 and a WB CQI index for codeword 2. The difference value in-between may have a value selected from a set {−4, −3, −2, −1, 0, 1, 2, 3} and can be represented as 3 bits.

The mode 2-0 corresponds to a case that CQI on a UE-selected band is transmitted in the absence of PMI transmission. In this case, RI is transmitted only in case of open-loop spatial multiplexing (SM) and a WB CQI represented as 4 bits may be transmitted. A best CQI (best-1) is transmitted on each bandwidth part (BP) and the best-1 CQI may be represented as 4 bits. And, an L-bit indicator indicating the best-1 may be transmitted together. If the RI is greater than 1, a CQI for a 1st codeword can be transmitted.

And, Mode 2-1 corresponds to a case that a single PMI and a CQI on a UE-selected band are transmitted. In this case, together with RI transmission, 4-bit WB CQI, 3-bit WB spiral differential CQI and 4-bit WB PMI can be transmitted. Additionally, 4-bit best-1 CQI is transmitted on each Bandwidth Part (BP) and L-bit best-1 indicator can be transmitted together. Additionally, if RI is greater than 1, 3-bit best-1 spatial differential CQI can be transmitted. In 2-codeword transmission, it may indicate a difference value between a best-1 CQI index of codeword 1 and a best-1 CQI index of codeword 2.

For the transmission modes, periodic PUCCH CSI report modes are supported as follows.

1) Transmission mode 1: Modes 1-0 and 2-0
2) Transmission mode 2: Modes 1-0 and 2-0
3) Transmission mode 3: Modes 1-0 and 2-0
4) Transmission mode 4: Modes 1-1 and 2-1
5) Transmission mode 5: Modes 1-1 and 2-1
6) Transmission mode 6: Modes 1-1 and 2-1
7) Transmission mode 7: Modes 1-0 and 2-0
8) Transmission mode 8: Modes 1-1 and 2-1 if a UE is set to make a PMI/RI reporting, or Modes 1-0 and 2-0 if a UE is set not to make a PMI/RI reporting
9) Transmission mode 9: Modes 1-1 and 2-1 if a UE is set to make a PMI/RI reporting and the number of CSI-RS ports is greater than 1, or Modes 1-0 and 2-0 if a UE is set not to make a PMI/RI reporting and the number of CSI-RS port(s) is equal to 1.

The periodic PUCCH CSIU reporting mode in each serving cell is set by upper layer signaling. And, Mode 1-1 is set to either submode 1 or submode 2 by an upper layer signaling using a parameter 'PUCCH_format1-1_CSI_reporting_mode'.

A CQI reporting in a specific subframe of a specific serving cell in a UE-selected SB CQI means a measurement of at least one channel state of a bandwidth part (BP) corresponding to a portion of a bandwidth of a serving cell. An index is given to the bandwidth part in a frequency increasing order starting with a lowest frequency without an increment of a bandwidth.

2.4 Method for Transmitting ACK/NACK on PUCCH 2.4.1 ACK/NACK Transmission in LTE System Under the situation that a UE simultaneously transmits a plurality of ACKs/NACKs corresponding to multiple data units received from an eNB, in order to maintain the single-carrier property of ACK/NACK signals and reduce the total ACK/NACK transmission power, ACK/NACK multiplexing method based on PUCCH resource selection can be considered. With ACK/NACK multiplexing, contents of the ACK/NACK signals for multiple data units are identified by the combination of the PUCCH resource used in actual ACK/NACK transmission and the one of QPSK modulation symbols. For example, if it is assumed that one PUCCH resource carries 4 bits and 4 data units can be transmitted in maximum (at this time, assume that HARQ operation for each data unit can be managed by single ACK/NACK bit), the Transmission (Tx) node can identify the ACK/NACK result based on the transmission position of the PUCCH signal and the bits of the ACK/NACK signal as shown in [Table 17] below.

TABLE 17

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In [Table 17], HARQ-ACK(i) indicates the ACK/NACK result for the data unit i. For example, if a maximum of 4 data units is transmitted, i=0, 1, 2, 3. In Table 17, DTX means that there is no data unit transmitted for corresponding HARQ-ACK(i) or the Reception (Rx) node doesn't detect the existence of the data unit corresponding to HARQ-ACK(i).

In addition, $n_{PUCCH,X}^{(1)}$ indicates the PUCCH resource which should be used in actual ACK/NACK transmission, if there are 4 PUCCH resources, a maximum of four PUCCH resources $n_{PUCCH,0}^{(1)}$, $n_{PUCCH,1}^{(1)}$, $n_{PUCCH,2}^{(1)}$ and $n_{PUCCH,3}^{(1)}$ may be allocated to the UE.

In addition, b(0),b(1) indicates two bits carried by the selected PUCCH resource. Modulation symbols which are transmitted through PUCCH resource are decided according to the bits. For example, if the RX node receives and decodes 4 data units successfully, the RX node should transmit two bits, (1, 1), using PUCCH resource $n_{PUCCH,1}^{(1)}$. For another example, if the RX node receives 4 data units and fails in decoding the first and the third data units (corresponding to HARQ-ACK(0) and HARQ-ACK(2)), the RX node should transmit (1, 0) using $n_{PUCCH,3}^{(1)}$.

By linking the actual ACK/NACK contents with the combination of PUCCH resource selection and the actual bit contents in the transmitted PUCCH resource in this way, ACK/NACK transmission using a single PUCCH resource for multiple data units is possible.

In ACK/NACK multiplexing method (see Table 17), basically, NACK and DTX are coupled as NACK/DTX if at least one ACK exists for all data units. This is because combinations of PUCCH resources and QPSK symbols are insufficient to cover all ACK, NACK and DTX hypotheses. On the other hand, for the case that no ACK exists for all data units (in other words, NACK or DTX only exists for all data units), single NACK decoupled with DTX is defined one as HARQ-ACK(i). In this case, PUCCH resource linked to the data unit corresponding to single NACK can be also reserved to transmit the signal of multiple ACKs/NACKs.

2.4.2 ACK/NACK Transmission in LTE-A System

In an LTE-A system (e.g., Rel-10, 11, 12, etc.), transmission of a plurality of ACK/NACK signals for a plurality of PDSCH signals, which is transmitted via a plurality of DL CCs, via a specific UL CC is considered. Unlike ACK/NACK transmission using PUCCH format 1a/1b of an LTE system, a plurality of ACK/NACK signals may be subjected to channel coding (e.g., Reed-Muller coding, Tail-biting convolutional coding, etc.) and then a plurality of ACK/NACK information/signals may be transmitted using PUCCH format 2 or a new PUCCH format (e.g., an E-PUCCH format) modified based on block spreading.

Figure 16:
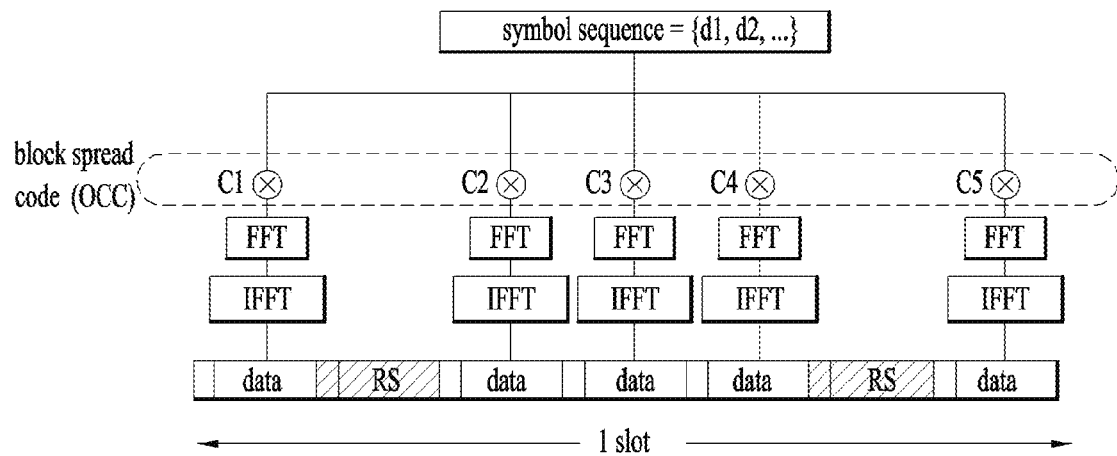
FIG. 16 is a view illustrating an exemplary new PUCCH format based on block spreading.

FIG. 16 shows an example of a new PUCCH format based on block spreading.

A block spreading scheme refers to a method for performing modulation using an SC-FDMA scheme unlike PUCCH format series 1 or 2 in an LTE system. The block spreading scheme refers to a scheme for time-domain spreading and transmitting a symbol sequence using an Orthogonal Cover Code (OCC) as shown in FIG. 16. That is, the symbol sequence is spread using the OCC to multiplex control signals of several UEs in the same RB.

In the above-described PUCCH format 2, one symbol sequence is transmitted over the time domain and UE multiplexing is performed using Cyclic Shift (CCS) of a CAZAC sequence. However, in the new PUCCH format based on block spreading, one symbol sequence is transmitted over the frequency domain and UE multiplexing is performed using time-domain spreading based on an OCC.

For example, as shown in FIG. 16, one symbol sequence may be generated as five SC-FDMA symbols by an OCC of length-5 (that is, SF=5). Although a total of 2 RS symbols is used during one slot in FIG. 16, various methods using three RS symbols and using an OCC of SF=4 may be used. At this time, the RS symbols may be generated from a CAZAC sequence having specific cyclic shift and may be transmitted in the form in which a specific OCC is applied (multiplied by) to a plurality of RS symbols of the time domain.

In the embodiments of the present invention, for convenience of description, a multi-ACK/NACK transmission scheme based on channel coding using PUCCH format 2 or a new PUCCH format (e.g., an E-PUCCH format) is defined as a "multi-bit ACK/NACK coding transmission method".

The multi-bit ACK/NACK coding method refers to a method for transmitting ACK/NACK code blocks generated by channel-coding ACK/NACK or DTX information (meaning that the PDCCH is not received/detected) for PDSCH signals transmitted on a plurality of DL CCs.

For example, when the UE operates on a certain DL CC in an SU-MIMO mode and receives two CodeWords (CW), the UE may have a maximum of five feedback states including a total of four feedback states of each CW, such as ACK/ACK, ACK/NACK, NACK/ACK and NACK/NACK, and DTX. When the UE receives a single CW, the UE may have a maximum of three states including ACK, NACK and/or DTX. When NACK and DTX are equally processed, the UE may have a total of two states such as ACK and NACK/DTX.

Accordingly, when the UE aggregates a maximum of five DL CCs and the UE operates on all DL CCs in an SU-MIMO mode, the UE may have a maximum of 55 transmittable feedback states. At this time, the size of ACK/NACK payload representing the 55 feedback states may be a total of 12 bits. If DTX and NACK are equally processed, the number of feedback states becomes 45 and the size of the ACK/NACK payload representing the feedback states is a total of 10 bits.

In an ACK/NACK multiplexing (that is, ACK/NACK selection) method applied to an LTE TDD system, fundamentally, an implicit ACK/NACK selection method in which an implicit PUCCH resource corresponding to a PDCCH scheduling each PDSCH (that is, linked to a smallest CCE index) is used for ACK/NACK transmission in order to secure a PUCCH resource of each UE.

In an LTE-A FDD system, transmission of a plurality of ACK/NACK signals for a plurality of PDSCH signals transmitted via a plurality of DL CCs via one UE-specific UL CC is considered. "ACK/NACK selection" methods using an implicit PUCCH resource linked to a PDCCH scheduling some or all DL CCs (that is, linked to a smallest CCE index nCCE or linked to nCCE and nCCE+1) or a combination of an implicit PUCCH and an explicit PUCCH resource pre-allocated to each UE via RRC signaling are considered.

Even in an LTE-A TDD system, aggregation of a plurality of CCs is considered. For example, when a plurality of CCs is aggregated, UE transmitting a plurality of ACK/NACK information/signals for a plurality of PDSCH signals transmitted via a plurality of DL subframes and a plurality of CCs via a specific CC (that is, A/N CC) in UL subframes corresponding to the plurality of DL subframes in which the PDSCH signals are transmitted is considered.

At this time, unlike LTE-A FDD, a method (that is, full ACK/NACK) for transmitting a plurality of ACK/NACK signals corresponding to a maximum number of CWs, which may be transmitted via all CCs allocated to the UE, for a plurality of DL subframes may be considered or a method (that is, bundled ACK/NACK) for applying ACK/NACK bundling to a CW, CC and/or a subframe region, reducing the number of transmitted ACKs/NACKs and performing transmission may be considered.

At this time, CW bundling means that ACK/NACK bundling for CW per CC is applied to each DL subframe and CC bundling means that ACK/NACK bundling for all or some CCs is applied to each DL subframe. In addition, subframe bundling means that ACK/NACK bundling for all or some DL subframes is applied to each CC.

As the subframe bundling method, an ACK counter method indicating a total number of ACKs (or the number of some ACKs) per CC for all PDSCH signals or DL grant PDCCHs received on each DL CC may be considered. At this time, the multi-bit ACK/NACK coding scheme or the ACK/NACK transmission scheme based on the ACK/NACK selection method may be configurably applied according to the size of the ACK/NACK payload per UE, that is, the size of the ACK/NACK payload for transmission of full or bundled ACK/NACK configured per UE.

2.5 Procedure for Transmitting and Receiving PUCCH

In a mobile communication system, one eNB transmits and receives data to and from a plurality of UEs via a wireless channel environment in one cell/sector. In a system operating using multiple carriers or the like, the eNB receives packet traffic from a wired Internet network and transmits the received packet traffic to each UE using a predetermined communication scheme. At this time, downlink scheduling is how the eNB determines when data is transmitted to which UE using which frequency domain. In addition, the eNB receives and demodulates data from the UE using a predetermined communication scheme and transmits packet traffic over a wired Internet network. Uplink scheduling is how the eNB determines when to enable which UE to transmit uplink data using which frequency domain. In general, a UE having a good channel state may transmit and receive data using more time and frequency resources.

Figure 17:
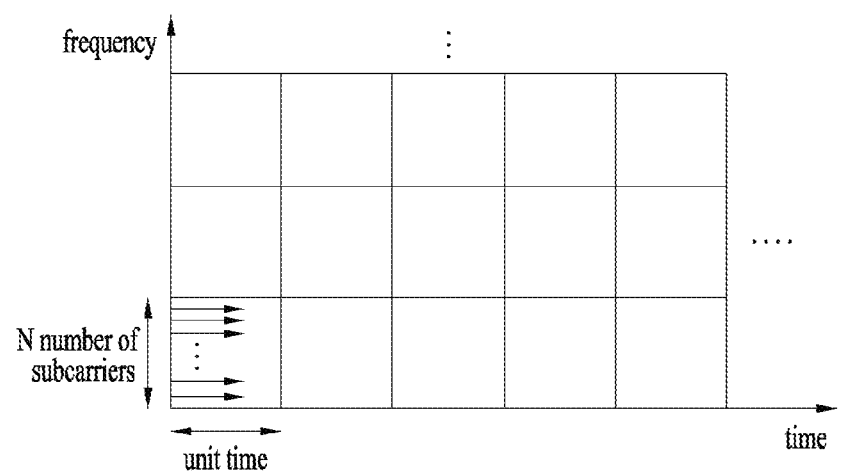
FIG. 17 is a view illustrating an exemplary configuration of a Resource Unit (RB) with time-frequency units.

In a system operating using multiple carriers or the like, resources may be roughly divided into a time domain and a frequency domain. The resources may be defined as resource blocks, which includes N subcarriers and M subframes or predetermined time units. At this time, N and M may be 1. FIG. 17 is a diagram showing an example of configuring a resource block in time-frequency units.

In FIG. 17, one rectangle means one resource block and one resource block has several subcarriers on one axis and has a predetermined time unit (e.g., slots or subframes) on the other axis.

In downlink, an eNB schedules one or more resource blocks to a UE selected according to a determined scheduling rule and transmits data using resource bocks allocated to the UE. In uplink, the eNB schedules one or more resource blocks to a UE selected according to a predetermined scheduling rule and a UE transmits data in uplink using the allocated resources.

An error control method performed when a (sub)frame, in which data is transmitted and received, is lost or damaged after transmitting and receiving data after scheduling includes an Automatic Repeat reQuest (ARQ) method and a Hybrid ARQ (HARQ) method.

In the ARQ method, fundamentally, a transmitter waits for an acknowledgement (ACK) message after transmitting one (sub)frame and a receiver sends the ACK only upon receiving the sub(frame). When an error occurs in the (sub)frame, a negative ACK (NAK) message is sent and information on a reception frame, in which an error occurs, is removed from a receiver buffer. The transmitter transmits a subsequent (sub)frame upon receiving the ACK message but retransmits the (sub)frame upon receiving the NAK message. Unlike the ARQ method, in the HARQ method, when the received frame cannot be demodulated, the receiver transmits the NAK message to the transmitter, but the received frame is stored in a buffer during a predetermined time and is combined with a retransmitted frame, thereby increasing a reception success rate.

Recently, a HARQ method more efficient than the ARQ method is widely used. The HARQ method may be divided into various methods. For example, the HARQ method may be divided into a synchronous HARQ method and an asynchronous HARQ method according to retransmission timing and into a channel-adaptive HARQ method and a channel-non-adaptive HARQ method depending on whether the amount of resources used for retransmission is influenced by a channel state.

The synchronous HARQ method refers to a method of performing subsequent retransmission at timing determined by a system when initial transmission fails. For example, if it is assumed that retransmission is performed every four time units after initial transmission fails, retransmission timing is predetermined between the eNB and the UE and is not signaled. However, when the data transmission side receives a NAK message, the frame is retransmitted every four time units until an ACK message is received.

Meanwhile, the asynchronous HARQ method may be performed by newly scheduling retransmission timing or via additional signaling. The retransmission timing of the previously failed frame may be changed by several factors such as channel state.

The channel-non-adaptive HARQ method refers to a method of using scheduling information (e.g., the modulation method of the frame, the number of used resource blocks, Adaptive Modulation and Coding (AMC), etc.), which is set upon initial transmission, upon retransmission. In contrast, the channel-adaptive HARQ method refers to a method of changing such scheduling information according to the channel state.

For example, in the channel-non-adaptive HARQ method, a transmission side transmits data using six resource blocks upon initial transmission and retransmits data using six resource blocks upon retransmission. In contrast, in the channel-adaptive HARQ method, initial transmission is performed using six resource blocks and retransmission is performed using greater or less than six resource blocks according to the channel state.

Although there are four HARQ methods, the asynchronous and channel-adaptive HARQ method and the synchronous and channel-non-adaptive HARQ method are mainly used. The asynchronous and channel-adaptive HARQ method may maximize retransmission efficiency by adaptively changing the retransmission timing and the amount of used resources according to the channel state but may increase overhead. Accordingly, the asynchronous and channel-adaptive HARQ method is not generally considered for uplink. In contrast, the synchronous and channel-non-adaptive HARQ method may not cause overhead because retransmission timing and resource allocation are predetermined in the system, but has very low retransmission efficiency in a considerably changed channel state.

To this end, in the current 3GPP LTE/LTE-A system, the asynchronous HARQ method is used in downlink and the synchronous HARQ method is used in uplink.

Figure 18:
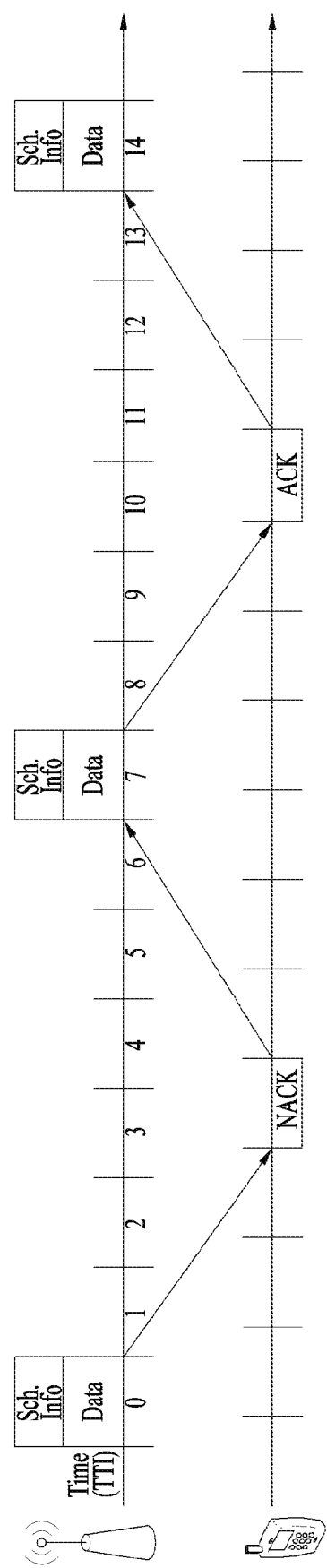
FIG. 18 is a view illustrating an exemplary method for resource allocation and retransmission in asynchronous Hybrid Automatic Repeat reQuest (HARQ)

FIG. 18 is a diagram showing an example of a resource allocation and retransmission method of an asynchronous HARQ method.

When an eNB transmits scheduling information in downlink, receives ACK/NAK information from a UE, and transmits next data, time delay occurs as shown in FIG. 19. This is channel propagation delay and delay occurring due to a time required for data decoding and data encoding.

A method of performing transmission using an independent HARQ process for data transmission without a gap during a delay period is being used. For example, if a shortest period from first data transmission to next data transmission is 7 subframes, data may be transmitted without a gap by setting 7 independent HARQ processes. In an LTE/LTE-A system, a maximum of eight HARQ processes may be allocated to one UE in non-MIMO.

2.6 CA Environment-Based CoMP Operation

Hereinafter, a cooperation multi-point (CoMP) transmission operation applicable to the embodiments of the present disclosure will be described.

In the LTE-A system, CoMP transmission may be implemented using a carrier aggregation (CA) function in the LTE. FIG. 19 is a conceptual view illustrating a CoMP system operating based on a CA environment.

In FIG. 19, it is assumed that a carrier operated as a PCell and a carrier operated as an SCell may use the same frequency band on a frequency axis and are allocated to two eNBs geographically spaced apart from each other. At this time, a serving eNB of UE1 may be allocated to the PCell, and a neighboring cell causing much interference may be allocated to the SCell. That is, the eNB of the PCell and the eNB of the SCell may perform various DL/UL CoMP operations such as joint transmission (JT), CS/CB and dynamic cell selection for one UE.

FIG. 19 illustrates an example that cells managed by two eNBs are aggregated as PCell and SCell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the PCell does not always need to participate in CoMP operation.

2.7 Reference Signal (RS)

Now, a description will be given of RSs which may be used in embodiments of the present disclosure.

FIG. 20 illustrates an example of a subframe to which UE-RSs are allocated, which may be used in embodiments of the present disclosure.

Referring to FIG. 20, the subframe illustrates REs occupied by UE-RSs among REs in one RB of a normal DL subframe having a normal CP.

UE-RSs are transmitted on antenna port(s) p=5, p=7, p=8 or p=7, 8, . . . , υ+6 for PDSCH transmission, where υ is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped.

The UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may decrease relative to overhead of the CRS.

In the 3GPP LTE-A system, the UE-RSs are defined in a PRB pair. Referring to FIG. 19, in a PRB having frequency-domain index nPRB assigned for PDSCH transmission with respect to p=7, p=8, or p=7, 8, . . . , υ+6, a part of UE-RS sequence r(m) is mapped to complex-valued modulation symbols.

UE-RSs are transmitted through antenna port(s) corresponding respectively to layer(s) of a PDSCH. That is, the number of UE-RS ports is proportional to a transmission rank of the PDSCH. Meanwhile, if the number of layers is 1 or 2, 12 REs per RB pair are used for UE-RS transmission and, if the number of layers is greater than 2, 24 REs per RB pair are used for UE-RS transmission. In addition, locations of REs occupied by UE-RSs (i.e. locations of UE-RS REs) in a RB pair are the same with respect to a UE-RS port regardless of a UE or a cell.

As a result, the number of DM-RS REs in an RB to which a PDSCH for a specific UE in a specific subframe is mapped is the same per UE-RS ports. Notably, in RBs to which the PDSCH for different UEs in the same subframe is allocated, the number of DM-RS REs included in the RBs may differ according to the number of transmitted layers.

The UE-RS can be used as the DM-RS in the embodiments of the present disclosure.

2.8 Enhanced PDCCH (EPDCCH)

In the 3GPP LTE/LTE-A system, Cross-Carrier Scheduling (CCS) in an aggregation status for a plurality of component carriers (CC: component carrier=(serving) cell) will be defined. One scheduled CC may previously be configured to be DL/UL scheduled from another one scheduling CC (that is, to receive DL/UL grant PDCCH for a corresponding scheduled CC). At this time, the scheduling CC may basically perform DL/UL scheduling for itself. In other words, a Search Space (SS) for a PDCCH for scheduling scheduling/scheduled CCs which are in the CCS relation may exist in a control channel region of all the scheduling CCs.

Meanwhile, in the LTE system, FDD DL carrier or TDD DL subframes are configured to use first n (n<=4) OFDM symbols of each subframe for transmission of physical channels for transmission of various kinds of control information, wherein examples of the physical channels include a PDCCH, a PHICH, and a PCFICH. At this time, the number of OFDM symbols used for control channel transmission at each subframe may be delivered to the UE dynamically through a physical channel such as PCFICH or semi-statically through RRC signaling.

Figure 21:
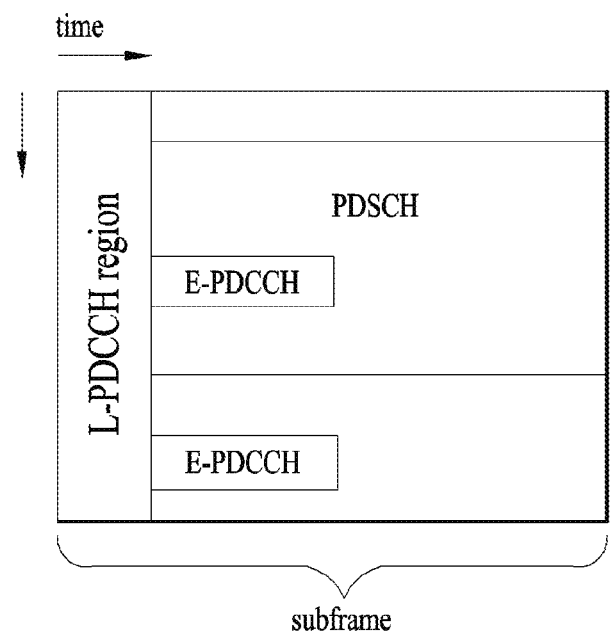
FIG. 21 is a view illustrating an exemplary multiplexing of a legacy Physical Downlink Channel (PDCCH), a Physical Downlink Shared Channel (PDSCH), and an Enhanced PDCCH (E-PDCCH) in the LTE/LTE-A system.

Meanwhile, in the LTE/LTE-A system, since a PDCCH which is a physical channel for DL/UL scheduling and transmitting various kinds of control information has a limitation that it is transmitted through limited OFDM symbols, enhanced PDCCH (i.e., E-PDCCH) multiplexed with a PDSCH more freely in a way of FDM/TDM may be introduced instead of a control channel such as PDCCH, which is transmitted through OFDM symbol and separated from PDSCH. FIG. 21 illustrates an example that legacy PDCCH, PDSCH and E-PDCCH, which are used in an LTE/LTE-A system, are multiplexed.

3. LTE-U System 3.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band.

Figure 22:
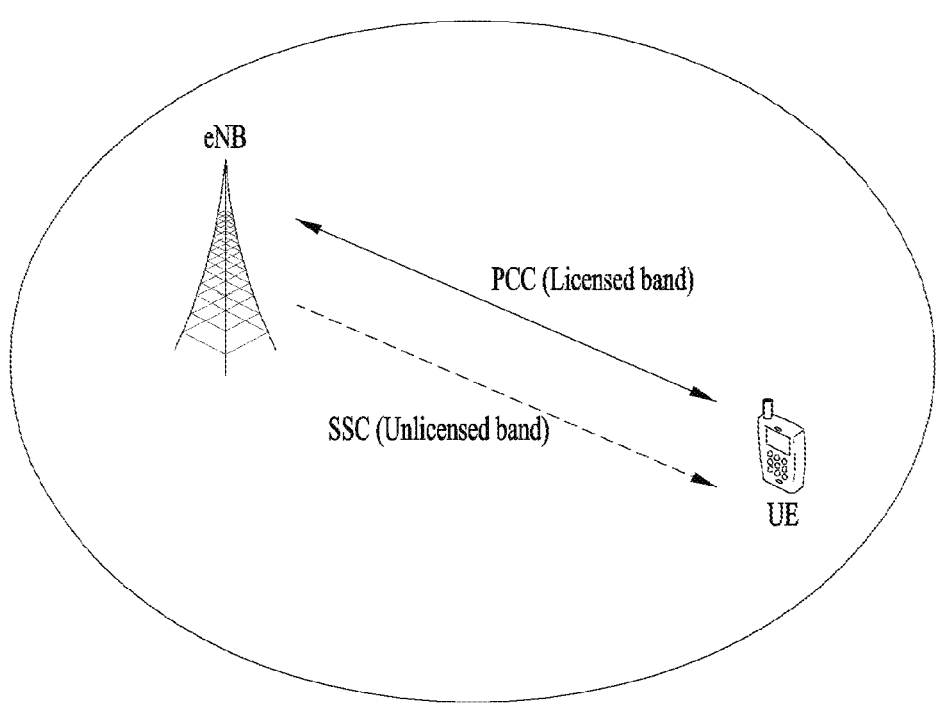
FIG. 22 is a view illustrating an exemplary CA environment supported in an LTE-Unlicensed (LTE-U) system.

FIG. 22 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 22, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 22 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

3.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 23:
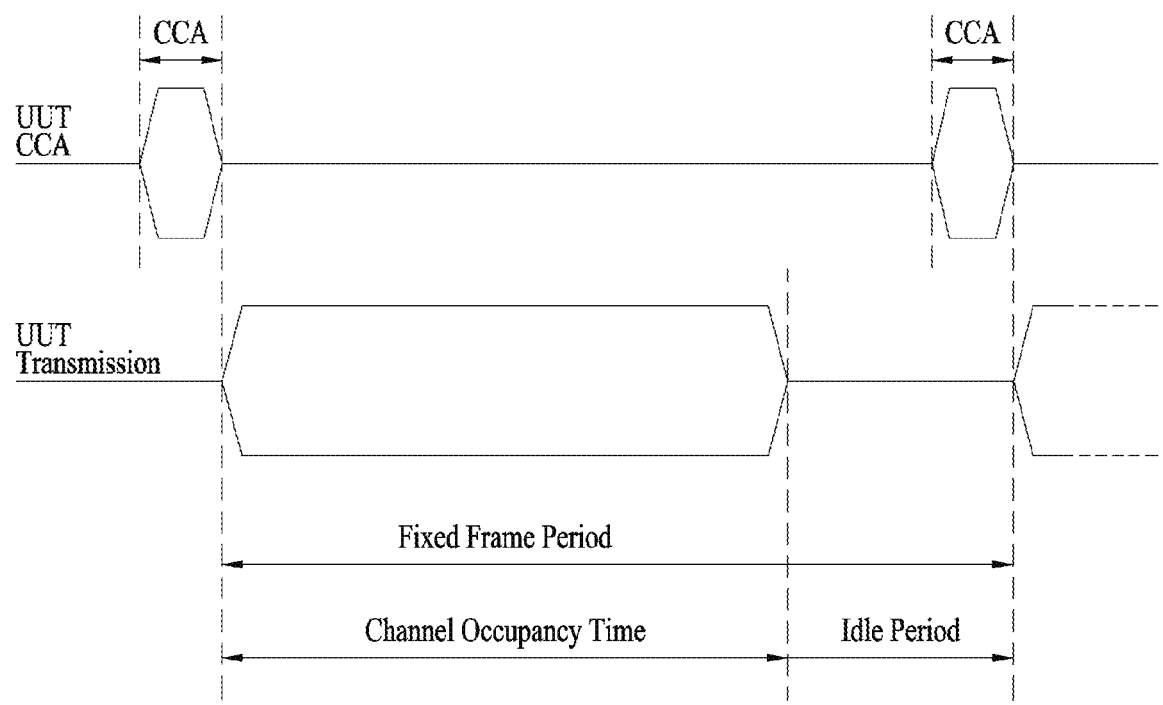
FIG. 23 is a view illustrating an exemplary Frame Based Equipment (FBE) operation as one of Listen-Before-Talk (LBT) operations.

FIG. 23 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 24:
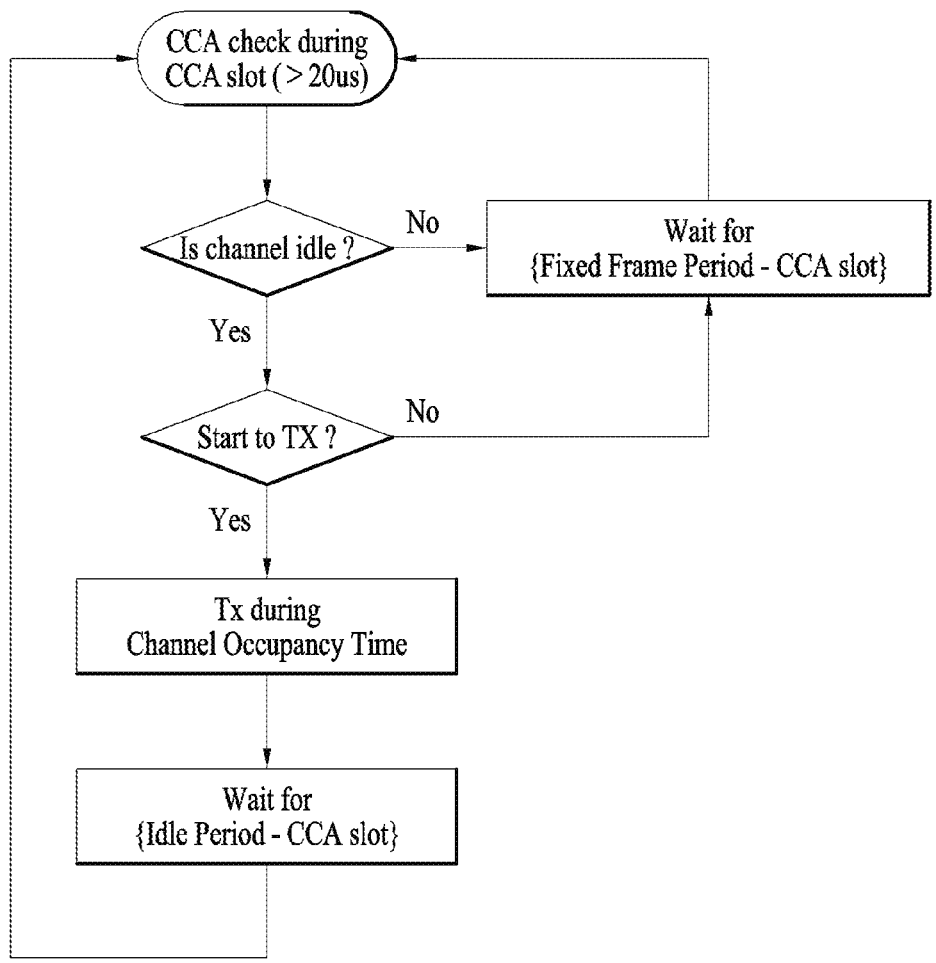
FIG. 24 is a block diagram illustrating the FBE operation.

FIG. 24 is a block diagram illustrating the FBE operation.

Referring to FIG. 24, a communication node (i.e., eNB) managing an SCell performs CCA during a CCA slot. If the channel is idle, the communication node performs data Transmission (Tx). If the channel is busy, the communication node waits for a time period calculated by subtracting the CCA slot from a fixed frame period, and then resumes CCA.

The communication node transmits data during the channel occupancy time. Upon completion of the data transmission, the communication node waits for a time period calculated by subtracting the CCA slot from the idle period, and then resumes CCA. If the channel is idle but the communication node has no transmission data, the communication node waits for the time period calculated by subtracting the CCA slot from the fixed frame period, and then resumes CCA.

FIG. 25 is a view illustrating an exemplary LBE operation as one of the LBT operations.

Referring to FIG. 25(a), in LBE, the communication node first sets q (q E {4, 5, ..., 32}) and then performs CCA during one CCA slot.

FIG. 25(b) is a block diagram illustrating the LBE operation. The LBE operation will be described with reference to FIG. 15(b).

The communication node may perform CCA during a CCA slot. If the channel is unoccupied in a first CCA slot, the communication node may transmit data by securing a time period of up to (13/32)q ms.

On the contrary, if the channel is occupied in the first CCA slot, the communication node selects N (N∈{1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms.

3.3. Discontinuous Transmission (DTX) on DL

DTX in an unlicensed carrier having a limited maximum transmission period may affect some functions required for operations of the LTE system. These functions may be supported by one or more signals transmitted at the start of a discontinuous LAA DL transmission. The functions supported by these signals include Automatic Gain Control (AGC) setting, channel reservation, and so on.

In a signal transmission of an LAA node, channel reservation refers to transmission of signals on channels acquired for signal transmission to other nodes after channel access through a successful LBT operation.

Functions supported by one or more signals for LAA operations including DL DTX include detection of an LAA DL transmission at a UE, and time and frequency synchronization of UEs. Requirements for these functions do not mean exclusion of other available functions, and these functions may be supported by other methods.

3.3.1 Time and Frequency Synchronization

A design purpose recommended for the LAA system is to support acquisition of time and frequency synchronization at a UE by a discovery signal for Radio Resource Management (RRM) measurement, each of RSs included in a DL transmission burst, or a combination of them. A discovery signal for RRM measurement, transmitted by a serving cell is used at least for coarse time or frequency synchronization.

3.3.3 DL Transmission Timing

In a DL LAA design, a SubFrame (SF) boundary may be adjusted based on a CA timing relationship between serving cells aggregated by CA defined in an LTE system (Rel-12 or below). However, this does not mean that an eNB starts a DL transmission only at an SF boundary. The LAA system may support a PDSCH transmission even though none of the OFDM symbols of one SF are available according to a result of an LBT operation. Herein, transmission of control information required for the PDSCH transmission should be supported.

3.4. RRM Measurement and Reporting

The LTE-A system may transmit a discovery signal at the start of supporting RRM functions including cell detection. The discovery signal may be referred to as a Discovery Reference Signal (DRS). To support the RRM functions for LAA, the discovery signal, and the transmission and reception functions of the LTE-A system may be modified and then applied.

3.4.1 DRS

The DRS of the LTE-A system was designed to support a small cell on-off operation. Off-small cells refer to small cells in a state where most functions except for periodic DRS transmission are deactivated. DRSs are transmitted with a periodicity of 40, 80, or 160 ms in a DRS transmission occasion. A Discovery Measurement Timing Configuration (DMTC) is a time period during which a UE may expect to receive a DRS. A DRS transmission occasion may occur anywhere within a DMTC, and the UE may expect that the DRS will be transmitted with a corresponding periodicity in an allocated cell.

The use of the DRS of the LTE-A system in the LAA system may bring about new constraints. For example, although a DRS transmission may be allowed in some regions, like a very short control transmission without LBT, a short control transmission without LBT may not be allowed in other regions. Accordingly, a DRS transmission may be subjected to LBT in the LAA system.

If LBT is applied to a DRS transmission, the DRS may not be transmitted periodically, as is done in the LTE-A system. Therefore, the following two methods may be considered for DRS transmissions in the LAA system.

First, the DRS is transmitted only at fixed time positions within a configured DMTC under the condition of LBT.

Secondly, a DRS transmission is allowed at at least one different time position within a configured DMTC under the condition of LBT.

In another aspect of the second method, the number of time positions may be restricted to 1 within one SF. Aside from a DRS transmission within a configured DMTC, a DRS transmission outside the configured DMTC may be allowed, if it is more useful.

Figure 26:
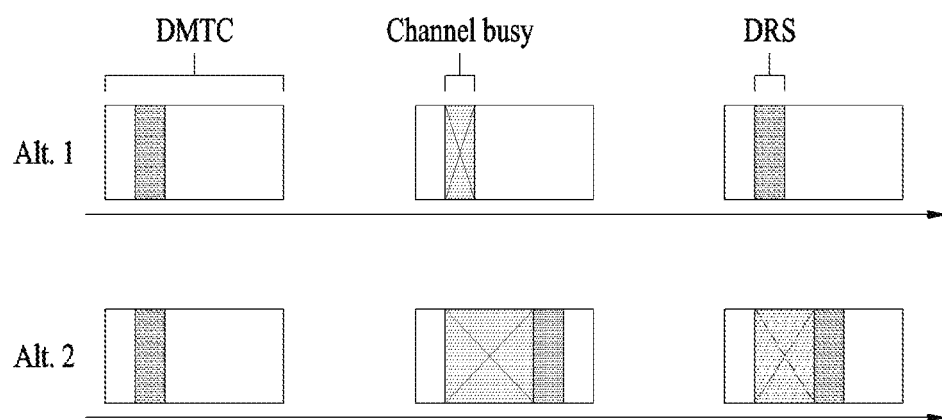
FIG. 26 is a view illustrating methods for transmitting a Discovery Reference Signal (DRS) supported in a Licensed Assisted Access (LAA) system.

FIG. 26 is a view illustrating DRS transmission methods supported in the LAA system.

Referring to FIG. 26, the upper part represents the above-described first DRS transmission method, and the lower part represents the second DRS transmission method. That is, a UE may receive the DRS only at a predetermined position within a DMTC period in the first DRS transmission method, whereas the UE may receive the DRS at any position within a DMTC period in the second DRS transmission method.

If a UE performs RRM measurement based on a DRS transmission in the LTE-A system, the UE may perform one RRM measurement based on a plurality of DRS occasions. If the DRS is used in the LAA system, transmission of the DRS at a specific position may not be ensured due to LBT-caused constraints. If the UE assumes the existence of the DRS in spite of non-transmission of the DRS from an eNB, the quality of an RRM measurement result reported by the UE may be degraded. Therefore, the LAA DRS should be designed such that the existence of the DRS in one DRS occasion has to be detected, which may ensure the UE to combine the successfully detected DRS occasions for the RRM measurement.

Signals including DRSs do not ensure adjacent DRS transmissions in time. That is, if no data is transmitted in SFs carrying DRSs, there may be OFDM symbols carrying no physical signal. During operation in an unlicensed band, other nodes may sense a corresponding channel as idle during this silent interval between DRS transmissions. To avert this problem, it is preferable to ensure configuration of transmission bursts including DRSs with adjacent OFDM symbols carrying a few signals.

3.5 Channel Access Procedure and Contention Window Adjustment Procedure

Hereinbelow, the afore-described Channel Access Procedure (CAP) and Contention Window Adjustment (CWA) will be described from the viewpoint of a transmission node.

Figure 27:
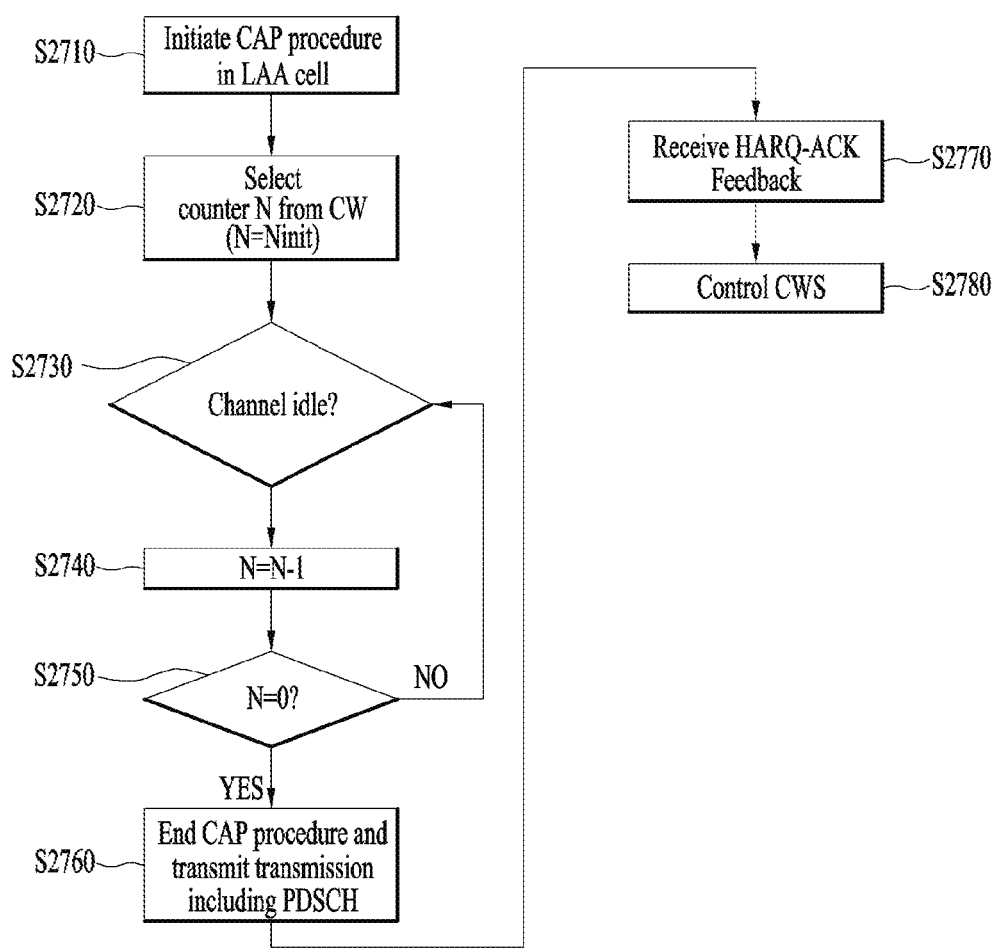
FIG. 27 is a view illustrating a Channel Access Procedure (CAP) and Contention Window Adjustment (CWA)

FIG. 27 is a view illustrating the CAP and CWA.

For a DL transmission, an LTE transmission node (e.g., an eNB) may initiate the CAP to operate in unlicensed cell(s), LAA SCell(s) (S2710).

The eNB may select a random backoff count N from a CW. Herein, N is set to an initial value Ninit (S2720).

The eNB determines whether a channel of LAA SCell(s) is idle, and if the channel is idle, decreases the backoff count by 1 (S2730 and S2740).

In FIG. 27, the order of steps S2730 and S2740 may be changed. For example, the eNB may first decrease the backoff count N and then determine whether the channel is idle.

If the channel is not idle, that is, the channel is busy in step S2730, the eNB may determine whether the channel is idle during a defer period (equal to or longer than 25 μsec) longer than a slot duration (e.g., 9 μsec). If the channel is idle during the defer period, the eNB may perform the CAP again. For example, if the backoff count Ninit is 10 and after the backoff count is decreased to 5, the eNB determines that the channel is busy, the eNB determines whether the channel is idle by sensing the channel during the defer period. If the channel is idle during the defer period, the eNB may perform the CAP again, starting the backoff count from 5 (or from 4 after the backoff count is decreased by 1), instead of setting the backoff count Ninit.

Referring to FIG. 27 again, the eNB may determine whether the backoff count N is 0 (S2750). If the backoff count N is 0, the eNB may end the CAP process and transmit a Tx burst including a PDSCH (S2760).

The eNB may receive HARQ-ACK information for the Tx burst from a UE (S2770).

The eNB may adjust a CWS based on the received HARQ-ACK information (S2780).

In step S2780, the CWS may be adjusted in any of the methods described in Section 4.1.1 to Section 4.1.3 For example, the eNB may adjust the CWS based on HARQ-ACK information for the first SF (i.e., the starting SF) of the latest transmitted Tx burst.

Herein, before performing CWP, the eNB may set an initial CW for each priority class. Subsequently, if the probability of determining HARQ-ACK values for a PDSCH transmitted in a reference SF to be NACK is at least 80%, the eNB increases the CW value set for each priority class to an allowed next level.

In step S2760, the PDSCH may be allocated by SCS or CCS. If the PDSCH is allocated by SCS, the eNB counts the DTX, NACK/DTX, or ANY state indicated by feedback HARQ-ACK information as NACK. If the PDSCH is allocated by CCS, the eNB counts the NACK/DTX and ANY states indicated by feedback HARQ-ACK information as NACK meanwhile the eNB does not count the DTX state indicated by feedback HARQ-ACK information as NACK.

If M (M>=2) SFs are bundled and bundled HARQ-ACK information is received, the eNB may regard the bundled HARQ-ACK information as M HARQ-ACK responses. Preferably, the bundled M SFs include a reference SF.

4. Method of Performing LBT in UL of LAA System

As more communication devices are requiring greater communication capacity, a next generation wireless communication system is trying to find ways to efficiently utilizing a limited frequency band. In particular, a cellular communication system such as LTE system considers utilizing such an unlicensed band as 2.4 GHz band mainly used by a legacy WiFi system and newly spotlighting 5 GHz band for traffic offloading.

Since an unlicensed band basically assumes that wireless transmission and reception are performed via contention between communication nodes, it is required for each communication node to perform channel sensing (CS) before a signal is transmitted to check whether or not a different communication node transmits a signal. For clarity, the above mentioned operation is referred to as LBT (listen before talk) in the present specification. In particular, an operation of checking whether or not a different communication node transmits a signal is defined as CS (carrier sensing). If it is determined as a different communication node transmits no signal, it is defined as CCA (clear channel assessment) is checked. For contents of LBT, CS, CCA, Cap, and the like, it may refer to the aforementioned paragraph 3.

In LTE system, an eNB and a UE should perform LBT to transmit a signal on an unlicensed band (hereinafter, LTE-U band or U-band). When the eNB or the UE transmits a signal, other communication nodes such as Wi-Fi and the like should perform LBT not to cause interference. For example, according to WiFi standard (802.11ac), a CCA threshold is regulated by −62 dBm for a non-WiFi signal and is regulated by −82 dBm for a WiFi signal. For example, when an STA or an AP performs CS in an unlicensed band, if a signal other than a WiFi signal is received with power equal to or greater than −62 dBm, the STA or the AP does not perform signal transmission on a corresponding channel in order not to cause any interference.

As mentioned in the foregoing description, it may be difficult to always guarantee DL transmission of an eNB or UL transmission of a UE on U-band. Hence, an LTE UE operating on the U-band may maintain access with a different cell operating on a licensed band (hereinafter, L-band) to stably control mobility, RRM (radio resource management) function, and the like.

In embodiments of the present invention, a serving cell accessed by a UE on the U-band (unlicensed band) is referred to as an UScell (or, U-Scell) and a serving cell accessed by the UE on the L-band (licensed band) is referred to as a Pcell. In particular, a scheme of performing data transmission/reception on the U-band using a combination with the L-band is generally called LAA (licensed assisted access).

A WiFi system operating on an unlicensed band uses a binary exponential backoff algorithm to avoid a collision between nodes. In the following, the binary exponential backoff algorithm performed on an unlicensed band is explained.

In order to perform the binary exponential backoff algorithm, it may be able to define a minimum value (CWmin) and a maximum value (CWmax) of a size of a contention window (CW) corresponding to a range from which a backoff counter value is selected.

For example, first of all, a transmission node selects a random integer value (e.g., 3) from a range ranging from '0' to 'CWmin−1'. When the transmission node performs CCA, if the number of slots of which a corresponding channel is in an idle state corresponds to N (e.g., 3), the transmission node may start signal transmission via the channel. If the transmission node fails to receive ACK in response to the signal transmission, it is regarded as a collision. The transmission node may double a CWS (contention window size) to reduce a collision probability.

In particular, when the transmission node attempts to perform retransmission, the transmission node selects a random integer value from a range ranging from '0' to 'CWmin*2−1' and attempts to perform a backoff operation. If the transmission node fails again, the transmission node selects a random integer value from a range ranging from '0' to 'CWmin*4−1'. If a CWmax value is less than CWmin*4, the transmission node selects a random integer value from a range ranging from '0' to 'CWmax−1'.

An LTE transmission node operating on an unlicensed band also selects a random integer value. If there exist idle slots as many as the selected integer value, it may use a backoff algorithm for transmission attempt. If the LTE transmission node and a WiFi node attempt to transmit a signal at the same time, a collision may occur between the LTE transmission node and the WiFi node due to the signal transmission attempt. If the collision occurs, the WiFi node doubles a CWS. Hence, in order to fairly coexist with the WiFi system, it is preferable for the LTE transmission node to increase a CWS as well without fixing the CWS.

In particular, when UL communication is performed by a UE to an eNB, in order to perform LBT, the present invention proposes a triggering event for controlling a CWS and explains a method of applying a changed CWS to an LBT process.

In the embodiments of the present invention, to control a CWS means that the CWS is increased, decreased, or maintained. For example, if a CWS is increased, it means that the CWS is increased as much as 'K1' times or is increased as much as 'L1'. If a CWS is decreased, it means that the CWS is initialized, is decreased as much as 'K2' times, or is decreased as much as 'L2'. And, if a CWS is increased after the CWS arrives at CWmax, it means that a CWmax size is maintained or is initialized by CWmin.

4.1 Method of Controlling CWS According to Control of eNB 4.1.1 Method of Utilizing ACK Information When ACK information is utilized together with a WiFi system, a UE can increase or decrease a CWS used for an LBT operation by utilizing PHICH corresponding to ACK/NACK information on uplink transmission.

If it is not allowed to indicate information on whether or not PUSCH, which is transmitted in an unlicensed band, is retransmitted via PHICH, a UE can control a CWS by utilizing NDI information of a UL grant. For example, if an NDI value related to a specific HARQ process number included in a UL grant received by a UE is not toggled, the UE can increase the CWS. If the NDI value is toggled, the UE can decrease the CWS.

4.1.2 Method of Utilizing RV Value

A UE can update a CWS by utilizing a received RV value. If the RV value is not '0', the UE can increase the CWS. If the RV value is '0', the UE can decrease the CWS.

For example, if an RV value included in a scheduling grant transmitted to a UE is '0', it relates to a new data transmission. If the RV value is not '0', it may indicate a case of retransmitting a previous data. In particular, when a UE retransmits data in a Ucell or when an RV value is not '0', the UE can perform LBT by increasing a CWS.

4.1.3 Method of Utilizing DCI

Whether or not a CWS is updated can be indicated by differentiating a scrambling sequence related to a UL grant DCI, a CRC mask, and/or a search space.

Or, whether or not a CWS is updated can be indicated by adding a new field to DCI. For example, a new field related to a CWS can be included in DCI. In this case, if the new field is set to '0', a UE may increase a CWS. If the new field is set to '1', the UE may decrease the CWS, Or, a UE may signal whether a CWS is to be increased or decreased via a common PDCCH or PHICH of an Scell of LAA system (i.e., U-Scell) or a Pcell of LTE system.

4.1.4 Method of Utilizing MCS

A UE can update a CWS performed in an LBT process by utilizing an MCS value. For example, if an MCS level configured at the time of retransmission is identical to an MCS level configured at the time of initial transmission or if a difference between MCS levels is equal to or less than a prescribed size (e.g., X), a UE can increase a CWS.

An MCS level corresponds to information necessary for modulating and coding a data bit. If the MCS level increases, it indicates that new transmission or channel environment is good. On the contrary, if the MCS level is maintained or is getting lower, it indicates that retransmission or channel environment is not good. In particular, since a UE is able to determine whether channel environment is good or bad according to the MCS level, the UE controls a CWS according to the MCS level to perform an LBT process. In particular, if the MCS level received via DCI or the like is the same or low, the UE increases the CWS. If the MCS level is high, the UE may decrease the CWS.

4.1.5 Explicit Signaling Method

In Rel-13 LAA system, 4 channel access priority classes are defined in total. And, LBT parameters including a length of a defer period, a CWS, MCOT (maximum channel occupancy time), and the like are defined according to each of the channel access priority classes. Hence, an eNB and/or a UE performs random backoff by utilizing LBT parameters determined according to a channel access priority class and may be then able to occupy a channel after the random backoff is completed. In this case, when the eNB and/or the UE access a channel, there is a limit on maximum transmission time.

In case of UL, similar to DL, it may be able to define a priority class. In this case, an eNB may directly inform a UE of a priority class assigned to the UE or a priority class for a data to be transmitted by the UE to configure LBT parameter values to be used for an LBT process (or, CAP process) performed by the UE.

In this case, the eNB can directly indicate a priority class to be used by the UE via (1) scheduling DCI, (2) Pcell of LTE system or common PDCCH of LAA Scell, (3) PHICH, or (4) higher layer signaling (e.g., RRC signal).

Figure 28:
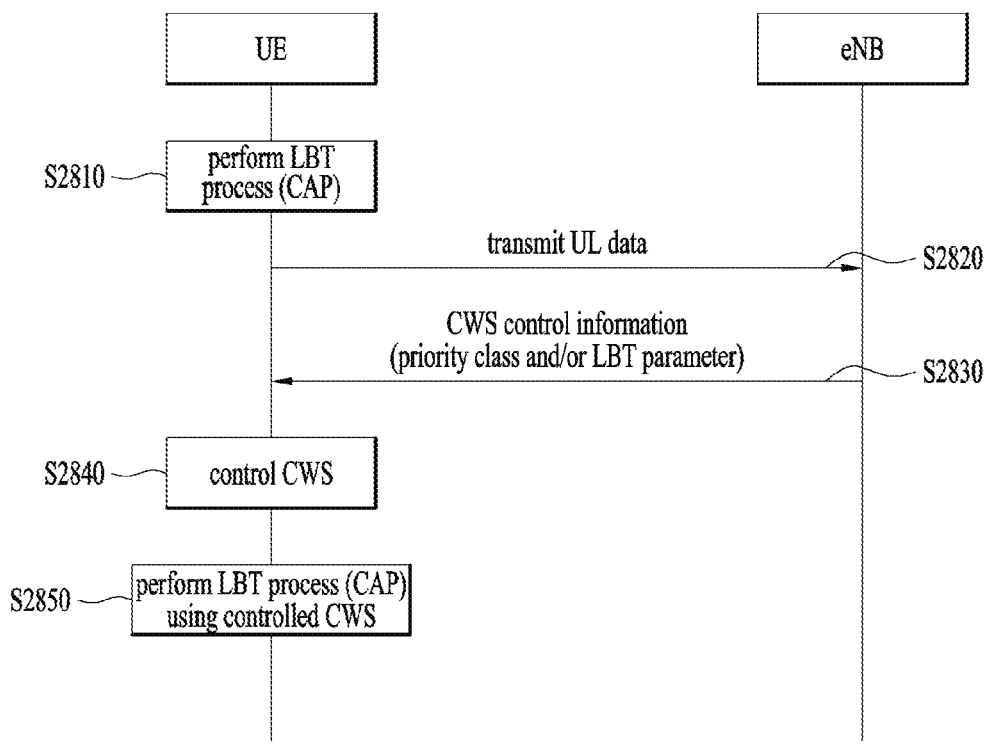
FIG. 28 is a flowchart for explaining a method of controlling a CWS according to one embodiment of the present invention.

FIG. 28 is a flowchart for explaining a method of adjusting a CWS according to one embodiment of the present invention.

Referring to FIG. 28, if a UE has uplink data to be transmitted via an unlicensed band, the UE can perform an LBT process (or, CAP process) in the unlicensed band [S2810].

The CAP process performed in the step S2810 can be explained with reference to FIG. 27. Although FIG. 27 is a diagram for explaining a process performed in DL, FIG. 27 can also be applied to UL using the identical scheme.

In the step S2810, if it is determined as a channel (or, carrier, U-Scell) of the unlicensed band is in an idle state, the UE can transmit UL data to an eNB via the channel [S2820].

If it is necessary to adjust a CWS, the eNB can transmit a radio signal (e.g., scheduling DCI, common PDCCH, PHICH, or RRC signal) including CWS adjust information (i.e., CWS control information) corresponding to information necessary for adjusting the CWS to the UE. The CWS adjust information may indicate a specific priority class indicating a CWS to be adjusted or include LBT parameter values related to the CWS to be controlled [S2830].

Having received the CWS adjust information from the eNB, the UE can control a CWS according to a priority class related to the CWS adjust information or an LBT parameter [S2840].

The UE can perform an LBT process (or, CAP process) using the adjusted CWS [S2850].

In FIG. 28, although the step S2830 is depicted as being performed after the step S2820, the step S2830 can be performed prior to the step S2810. In this case, the LBT process can be performed in the step S2810 based on the information received in the step S2830.

In the following, methods for an eNB to adjust a CWS via explicit signaling, in particular, methods of configuring CWS adjust information are explained.

As an aspect of the present embodiment, an eNB can connect a CWS value to a priority class.

For example, assume that a priority class 1 is configured by CWmin=3, CWmax=7 and a priority class 2 is configured by CWmin=15, CWmax=31. In this case, if a CWS value is indicated by 7, a UE can perform an LBT process by applying an LBT parameter corresponding to the priority class 1. For example, in the step S2830 of FIG. 28, if the eNB configures a CWS corresponding to one of LBT parameters by '7' and transmits the CWS to the UE, the UE adjusts the CWS to 7 in the step S2840 and can perform an LBT process according to a priority class corresponding to the CWS '7' in the step S2850.

As a different aspect of the present embodiment, the eNB can inform the UE of a priority class by connecting a HARQ process number value to the priority class.

For example, HARQ process numbers 1 to 4 may correspond to a priority class 1 and HARQ process number 5 to 8 may correspond to a priority class 2. The abovementioned configuration can be promised in advance or can be set to the UE via RRC signaling. In this case, in order to transmit UL data for a HARQ process number 3, the UE can perform LBT by applying an LBT parameter corresponding to the priority class 1. Referring to FIG. 28, the eNB can transmit scheduling DCI or common PDSCH including a HARQ process number to the UE in the step S1830. In this case, the UE adjusts a CWS using an LBT parameter corresponding to a priority class according to the HARQ process number in the step S2840 and can perform LBT process in the step S2850.

As a further different aspect of the present embodiment, the eNB can inform the UE of a priority class by connecting the number of continuously scheduled subframes to the priority class.

For example, when 2 or more continuous SFs are allocated to the UE, the UE can be configured to perform LBT by applying an LBT parameter corresponding to a priority class 2. When a single SF is allocated to the UE only, the UE can be configured to perform LBT by applying an LBT parameter corresponding to a priority class 1. Of course, a priority class 3, a priority class 4, or a different priority class can be mapped according to the prescribed number of continuous SFs. For example, if continuous SFs equal to or greater than 5 SFs are allocated to the UE, the UE can perform LBT based on a CWS corresponding to a priority class 3 or 4.

As a further different aspect of the present embodiment, the eNB can inform the UE of a priority class by connecting an MCOT parameter to the priority class. For example, an MCOT value for a priority class 1 (or, a priority class 2) can be defined by 2 ms (or, 3 ms). In this case, the eNB can inform the UE that an MCOT parameter corresponds to 2 ms via scheduling DCI, LAA Scell, common PDCCH of Pcell, or PHICH. Having received the MCOT parameter, the UE can perform LBT by applying an LBT parameter corresponding to the priority class 1. Referring to FIG. 28, if the eNB transmits an MCOT parameter value to the UE in the step S2830, the UE adjusts a CWS using an LBT parameter according to a priority class connected to the MCOT value and may be then able to perform LBT process.

4.2 Method for a UE to Autonomously Control a CWS

In the paragraph 4.1, embodiments for controlling a CWS via a control of an eNB have been explained. As mentioned earlier in the methods, if such ACK/NACK information received from the eNB as PHICH, NDI, or RV is utilized, due to the characteristic of LTE system, delay time of at least 4 ms occurs between actual PUSCH transmission and ACK/NACK information. In particular, unlike WiFi system, LAA system has a demerit in that it is unable to immediately apply ACK/NACK information.

In order to solve the problem, methods for a UE to autonomously control/update a CWS according to a predefined rule instead of a control (i.e., feedback information) of an eNB are explained in the embodiments described in the following.

4.2.1 Method 1

If a scheduled PUSCH transmission or a contention-based PUSCH transmission capable of being transmitted without a UL grant is dropped, a UE can increase a CWS.

For example, assume that 3 continuous SFs starting from an SF # N are allocated to a UE and the UE performs LBT during the K number of SC-OFDM symbols immediately before each SF boundary to perform PUSCH transmission.

If the LBT is not completed until a start boundary of the SF # N is passed, the UE can continuously perform LBT for PUSCH transmission scheduled in an SF # N+1 while dropping PUSCH TX scheduled in the SF # N. In this case, if the PUSCH TX scheduled in the SF # N is dropped, it may increase a CWS.

If the LBT is completed immediately before the start boundary of the SF # N+1, it may apply the increased CWS when LBT is performed for SF # N+2 transmission or a next TX burst transmission.

If the PUSCH TX scheduled in the SF # N+1 is also dropped, it may be able to configure the UE to increase the CWS again.

4.2.2 Method 2

If LBT is not completed during a prescribed time window, a UE can increase a CWS.

For example, if LBT is not completed during T_lbt time, the UE can increase a CWS. The T_lbt time may correspond to a value derived from a current CWS or a specific CWS value, a value derived from a backoff counter value selected by the UE, a value set to a system in advance, or a value configured by an eNB via RRC signaling.

Or, if the LBT is not completed during the N_lbt number of ECCA slots time, the UE can increase the CWS. The N_lbt slot time may correspond to a value derived from a current CWS or a specific CWS value, a value derived from a backoff counter value selected by the UE, a value set to a system in advance, or a value configured by an eNB via RRC signaling.

4.3 Method of Directly Indicating CWS Value

An eNB measures a network status of an unlicensed band for prescribed time and may be then able to configure an appropriate CWS value. For example, the eNB can transmit RRC signaling or physical layer signaling (e.g., DCI, etc.) including a CWS value to a UE. The UE can perform an LBT operation based on the received CWS value.

In this case, if there is a timer value set to a system in advance or the timer value is received via RRC or DCI, the UE can perform LBT based on the received CWS value during the timer value or until a different CWS value is received.

As a different aspect of the present embodiment, it may signal LBT parameters such as CWmin, CWmax, and the like rather than a specific CWS value. For example, the CWmin and the CWmax parameters are configured via RRC or physical layer signaling and CWS control can be individually performed by the UE based on a received LBT parameter.

4.4 Method of Controlling CWS According to Data Transmission Form

It may be able to configure a UE to perform LBT by applying a preconfigured CWmin or a preconfigured CWS value to retransmission and perform CWS update/control on initial transmission only. For example, if an NDI value is not toggled or a UL grant of which an RV value is not 0 is received, the UE can perform the LBT by applying CWmin or a preconfigured CWS value.

In particular, when UL data is firstly transmitted, the UE controls a CWS using the embodiments mentioned earlier in the paragraphs 4.1 to 4.3. On the contrary, when UL data is retransmitted, the UE can perform the LBT based on a preconfigured CWS value or a preconfigured CWmin value.

As a different aspect of the present embodiment, when a UL data is retransmitted, although an event for increasing a CWS is triggered in a previous transmission, the UE may maintain the CWS without increasing the CWS. And, when retransmission is performed, the UE may maintain a previous CWS without increasing the CWS and may be able to apply an increased CWS in a next transmission.

4.5 Method of Controlling CWS According to Retransmission Count

If retransmission is performed more than N times for (1) the same TB transmission, (2) the preconfigured number of TB transmissions, or (3) a prescribed time period, or if a scheduling grant of which NDI is not toggled is received more than N times, the UE can increase a CWS.

In this case, the N may correspond to a predetermined value or a value configured via physical layer signaling or higher layer signaling. In this case, it may be able to identically apply the embodiment mentioned earlier in the paragraph 4.4.

4.6 Method of Performing LBT Performed by eNB to Perform UL Transmission

If an eNB performs LBT on behalf of a UE and a specific condition is satisfied, it may be able to configure the UE to mandatorily transmit scheduled PUSCH without LBT. For example, if it is configured to transmit UL data without LBT in a UL grant, the UE may attempt to transmit scheduled PUSCH without LBT in a corresponding subframe.

In this case, the specific condition may correspond to a case that a difference between the timing at which transmission of the eNB ends and the timing at which transmission of the UE starts is within X us. Due to the characteristic of LTE system, there exists a time gap as much as k ms (e.g., k=4) between a UL grant and a PUSCH transmission. In this case, if the UE receives a UL grant, which indicates the UE to perform UL transmission without performing LBT, in an SF # N, the UE may assume that the eNB performs DL transmission during a period ranging from an SF # N to an SF # N+3 (or, a part of SFs among the SFs). In particular, the UE assumes reference resources during the period ranging from the SF # N to the SF # N+3 (or, a part of SFs among the SFs) and can utilize the reference resources for measuring purpose.

As a different aspect of the present embodiment, it may be able to configure a specific condition to make the UE mandatorily transmit a scheduled PUSCH without performing LBT. For example, the specific condition may correspond to a case that the UE autonomously checks whether or not there is a DL channel transmission prior to transmission of a scheduled PUSCH.

In particular, if there is a PDSCH (or, PDCCH or PHICH) scheduled to the UE prior to a scheduled PUSCH transmission, it may be able to configure the UE to transmit a scheduled PUSCH, which is to be transmitted in a next SF of the timing at which the PDSCH is received, without LBT.

Or, if an RS (e.g., CRS, CSI-RS, etc.) and a DRS are discovered prior to the timing at which a scheduled PUSCH is transmitted, it may be able to configure the UE to transmit a scheduled PUSCH, which is to be transmitted in a next SF of the timing at which the RS is received, without LBT.

Or, when the UE receives length information of a previous SF via a common PDCCH of the previous SF in which a scheduled PUSCH is transmitted, if a length of the previous SF corresponds to a specific value (e.g., 12 OFDM symbols), it may be able to configure the UE to transmit a scheduled PUSCH, which is to be transmitted in a next SF, without LBT. In this case, the specific value of the SF length may correspond to a predetermined value or a value configured via RRC signaling or physical layer signaling. The abovementioned method can be applied not only to a scheduled PUSCH transmission but also to a contention-based PISCH transmission which is allowed to be transmitted without a UL grant.

4.7 Method of Detecting UL Data

When a UE is configured to perform LBT to transmit a scheduled PUSCH transmission, if the LBT fails, the PUSCH transmission may not be performed. Hence, it is necessary for an eNB to always perform BD (blind detection) to check whether or not the scheduled PUSCH is transmitted. Specifically, since the eNB is unable to anticipate a UL data to be transmitted on PUSCH, the eNB performs BD on a DM-RS, which is transmitted together with the UL data, to check whether or not the PUSCH is transmitted.

For example, if the eNB fails to perform BD on a DM-RS in a first slot of an SF in which the scheduled PUSCH is expected to be transmitted, the eNB may assume that the scheduled PUSCH is not transmitted in the SF. Hence, the eNB performs LBT in the SF. If a channel is in an idle state in the SF, the eNB configures a DL SF to more efficiently utilize a resource.

In the aspect of the UE, when a UL data transmission is not scheduled in a next SF, if the UE fails to perform LBT for a transmission in a current SF, the UE may attempt to receive a DL burst starting from a second slot of the current SF or a next SF.

As a method for the eNB to detect whether or not a scheduled PUSCH is transmitted from the UE, the eNB performs BD on a DM-RS which is transmitted together with a UL data. Or, the eNB may perform BD on a specific channel (e.g., PUCCH) or a specific sequence (e.g., SRS) transmitted in a first SF of a UL TX burst.

Figure 29:
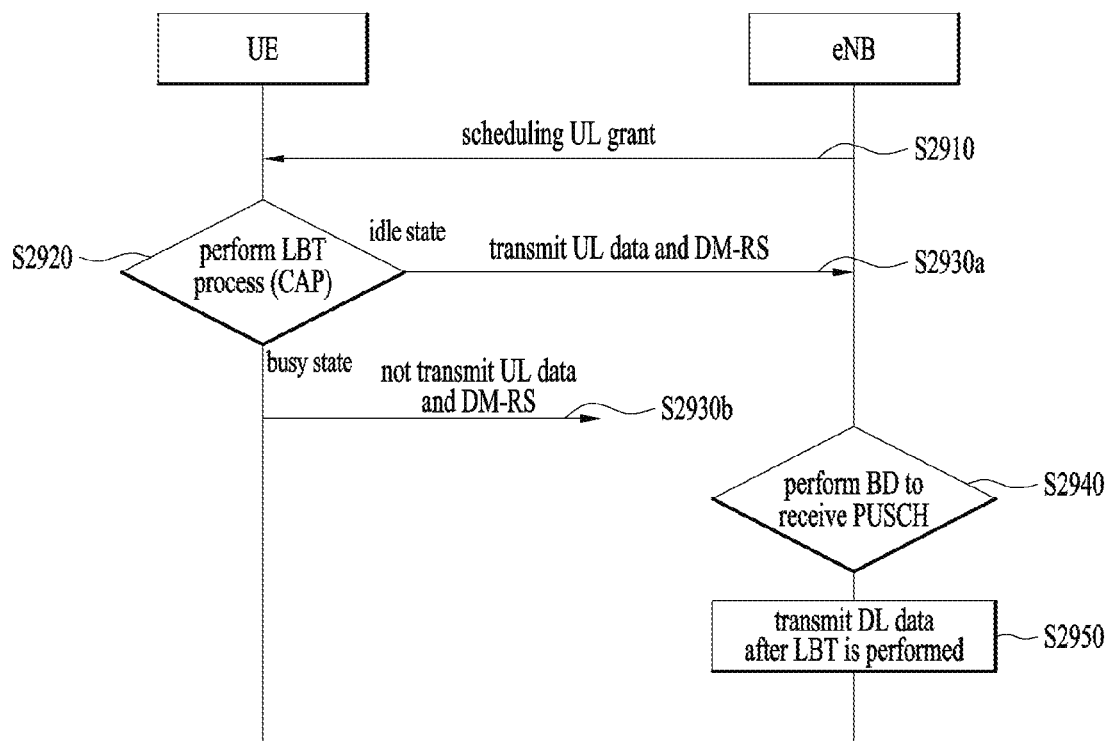
FIG. 29 is a flowchart for explaining one of methods for detecting a scheduled uplink data according to one embodiment of the present invention.

FIG. 29 is a flowchart for explaining one of methods for detecting a scheduled uplink data according to one embodiment of the present invention.

Referring to FIG. 29, an eNB can transmit a scheduling UL grant to a UE to schedule PUSCH in an Ucell.

Having received the scheduling UL grant, the UE can perform an LBT process before a UL data is transmitted [S2920].

When the LBT process is performed, if the Ucell is in an idle state, the UE can transmit a DM-RS to the eNB together with the UL data [S2930a].

When the LBT process is performed, if the Ucell is in a busy state, the UE is unable to transmit the UL data in a scheduled subframe.

Although the eNB schedules PUSCH in a certain SF, the eNB is unable to know UL data transmitted via the PUSCH by the UE. Hence, it is necessary for the eNB to perform BD on the DM-RS transmitted together with the PUSCH [S2940].

If the eNB performs BD in an SF scheduled to the UE and detects a DM-RS, the eNB regards it as the UE transmits the UL data via the PUSCH. The eNB decodes the SF and may be then able to receive the UL data.

If the eNB fails to perform BD on the DM-RS, the eNB assumes that the UE does not transmit the UL data in the subframe. The eNB performs LBT and may be then able to transmit DL data to the UE.

In FIG. 29, the method mentioned earlier in the paragraph 4.1, 4.3 or 4.3 can be applied to the scheduling UL grant transmitted in the step S2910. In particular, the UE controls a CWS based on the abovementioned methods and can perform LBT process.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB/location server informs a UE of information on whether to apply the proposed methods (or, information on rules of the proposed methods) via a predefined signal (e.g., physical layer signal or higher layer signal).

5. Apparatuses

Figure 30:
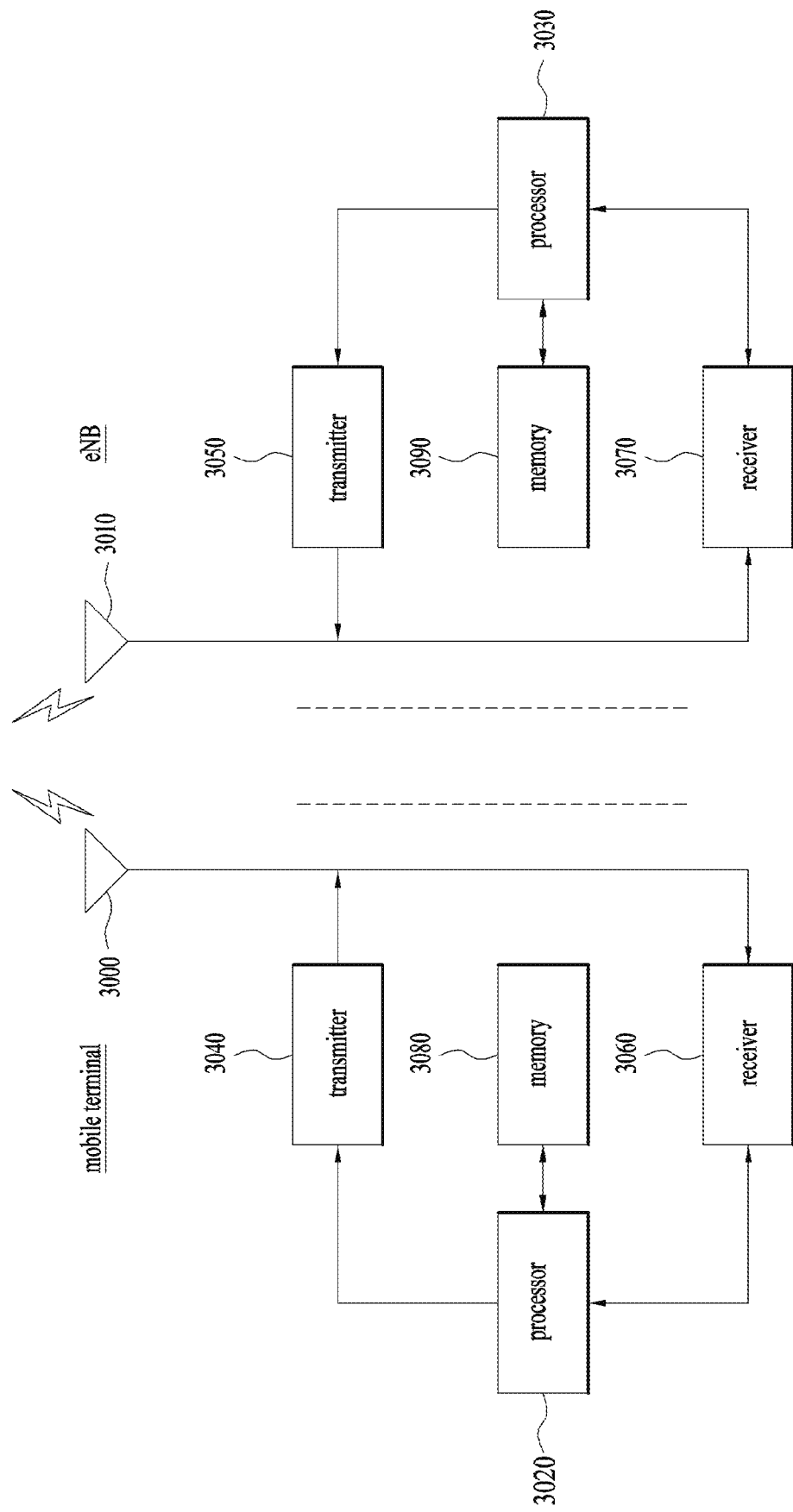
FIG. 30 is a diagram for explaining a device capable of implementing the methods mentioned earlier in FIGS. 1 to 29.

Apparatuses illustrated in FIG. 30 are means that can implement the methods described before with reference to FIGS. 1 to 29.

A UE may act as a transmission end on a UL and as a reception end on a DL. An eNB may act as a reception end on a UL and as a transmission end on a DL.

That is, each of the UE and the eNB may include a Transmitter (Tx) 3040 or 3050 and a Receiver (Rx) 3060 or 3070, for controlling transmission and reception of information, data, and/or messages, and an antenna 3000 or 3010 for transmitting and receiving information, data, and/or messages.

Each of the UE and the eNB may further include a processor 3020 or 3030 for implementing the afore-described embodiments of the present disclosure and a memory 3080 or 3090 for temporarily or permanently storing operations of the processor 3020 or 3030.

The embodiment of the present invention can be performed using the components and the functions of the UE and the eNB. For example, the processor of the eNB and/or the UE controls a transmitter and a receiver to perform CAP (or, CS, CAA process, etc.) to determine whether or not an LAA cell is in an idle state. For example, the UE can include a transmitter, a receiver, and a processor configured to control a CWS, the processor configured to control the receiver to receive a radio signal including CWS adjust information corresponding to information necessary for adjusting a CWS from the eNB, the processor configured to control a CWS based on the CWS adjust information, the processor configured to control the transmitter and the receiver to perform an LBT (listen before talk) process using the adjusted CWS, the processor, if an unlicensed band is in an idle state as a result of the LBT process, configured to control the transmitter to transmit uplink data. For details, it may refer to the methods mentioned earlier in the paragraphs 1 to 4.

The Tx and Rx of the UE and the eNB may perform a packet modulation/demodulation function for data transmission, a high-speed packet channel coding function, OFDM packet scheduling, TDD packet scheduling, and/or channelization. Each of the UE and the eNB of FIG. 30 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 3080 or 3090 and executed by the processor 3020 or 3030. The memory is located at the interior or exterior of the processor and may transmit and receive data to and from the processor via various known means.

Those skilled in the art will appreciate that the present disclosure may be carried out in other specific ways than those set forth herein without departing from the idea and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method of adjusting a contention window size (CWS) by a user equipment (UE) to transmit uplink data in a wireless access system supporting an unlicensed band, the method comprising:
   receiving downlink control information (DCI) including a new data indicator (NDI) from a base station;
   adjusting the CWS based on a determination whether a value of the NDI is toggled;
   performing a channel sensing of the unlicensed band based on the adjusted CWS; and
   transmitting the uplink data scheduled by the DCI, based on a determination that the unlicensed band is in an idle state as a result of the channel sensing.

2. The method of claim 1, wherein the DCI includes information on a priority class for the channel sensing performed by the UE.

3. A user equipment (UE) configured to adjust a contention window size (CWS) to transmit uplink data in a wireless access system supporting an unlicensed band, comprising:
   a transmitter;
   a receiver; and
   a processor,
   wherein the processor is configured to:
   control the receiver to receive downlink control information (DCI) including a new data indicator (NDI) from a base station;
   adjust the CWS based on a determination whether a value of the NDI is toggled;
   control the transmitter and the receiver to perform a channel sensing of the unlicensed band based on the adjusted CWS; and
   control the transmitter to transmit the uplink data scheduled by the DCI, based on a determination that the unlicensed band is in an idle state as a result of the channel sensing.

4. The UE of claim 3, wherein the DCI includes information on a priority class for the channel sensing performed by the UE.

5. The method of claim 1, wherein adjusting the CWS based on a determination whether the value of the NDI is toggled comprises:
   increasing the CWS, based on a determination that (i) the value of the NDI is not toggled and (ii) the CWS is not a maximum CWS value;
   maintaining the CWS, based on a determination that (i) the value of the NDI is not toggled and (ii) the CWS is the maximum CWS value; and
   initializing the CWS to a minimum CWS value, based on determination that the value of the NDI is toggled.

6. The UE of claim 3,
   wherein the processor is configured to increase the CWS, based on a determination that (i) the value of the NDI is not toggled and (ii) the CWS is not a maximum CWS value,
   wherein the processor is configured to maintain the CWS, based on a determination that (i) the value of the NDI is not toggled and (ii) the CWS is the maximum CWS value, and
   wherein the processor is configured to initialize the CWS to a minimum CWS value, based on a determination that the value of the NDI is toggled.

* * * * *